United States Patent [19]
Mochizuki et al.

[11] Patent Number: 6,097,690
[45] Date of Patent: Aug. 1, 2000

[54] OPTICAL PICKUP AND DISC PLAYER

[75] Inventors: Tsutomu Mochizuki; Katsuhiko Yamada, both of Chiba, Japan

[73] Assignee: Sony Corporation, Tokyo, Japan

[21] Appl. No.: 08/983,617

[22] PCT Filed: May 9, 1997

[86] PCT No.: PCT/JP97/01573

§ 371 Date: Jan. 9, 1998

§ 102(e) Date: Jan. 9, 1998

[87] PCT Pub. No.: WO97/42632

PCT Pub. Date: Nov. 13, 1997

[30] Foreign Application Priority Data

May 9, 1996 [JP] Japan ..................................... 8-139424
Jun. 21, 1996 [JP] Japan ..................................... 8-162138

[51] Int. Cl.$^7$ ....................................................... G11B 7/12
[52] U.S. Cl. ..................... 369/112; 369/44.15; 369/44.37
[58] Field of Search .............................. 369/58, 116, 112, 369/110, 111, 44.37, 44.38, 44.14, 44.15, 44.12, 44.17, 44.16, 44.19, 54

[56] References Cited

U.S. PATENT DOCUMENTS

| 5,216,534 | 6/1993 | Boardman et al. ..................... 359/209 |
| 5,673,247 | 9/1997 | Sekimoto et al. ..................... 369/112 |

FOREIGN PATENT DOCUMENTS

| 0 312 105 | 4/1989 | European Pat. Off. . |
| 0 470 807 | 2/1992 | European Pat. Off. . |
| 0 742 552 | 11/1996 | European Pat. Off. . |
| 7-354198 | of 0000 | Japan . |
| 61-177652 | 8/1986 | Japan . |
| P063-112832 | 5/1988 | Japan . |
| 63-304437 | 12/1988 | Japan . |
| P03-88129 | 4/1991 | Japan . |
| P03-296939 | 12/1991 | Japan . |
| P04-205821 | 7/1992 | Japan . |
| P06-168472 | 6/1994 | Japan . |
| 9-237428 | 9/1997 | Japan . |
| 9715922 | 5/1997 | WIPO . |

*Primary Examiner*—Muhammad Edun
*Attorney, Agent, or Firm*—Ronald P. Kananen; Rader, Fishman & Grauer

[57] ABSTRACT

A disc player provided with an optical pick-up including plural object lens so that write and read operations of information signals can be carried out with respect to plural kinds of discs in which thicknesses of transparent bases are different from each other. In order that tracking error signal can be satisfactorily detected even in the case where either one of object lenses is used, a biaxial actuator 3 for supporting an object lens 5 moved on a line which is off the central axis C of a spindle motor 17 is disposed in a manner inclined by a predetermined angle θ with respect to the axis of a guide shaft 18, and movement operation direction of the object lens 5 is caused to be close to the direction perpendicular to recording tracks of the optical disc caused to undergo rotational operation by the spindle motor 17.

26 Claims, 15 Drawing Sheets

OPTICAL PICKUP AND DISC PLAYER

BACKGROUND OF THE INVENTION

1. Field of the Invention

This invention relates to an optical pick-up adapted for carrying out write and read operations of information signals with respect to disc-shaped optical recording media such as an optical disc or a magneto-optical disc.

Further, this invention relates to a disc player adapted for carrying out recording and reproduction of information signals with respect to disc-shaped recording media such as an optical disc or a magneto-optical disc.

2. Description of Related Art

Hitherto, as a recording medium for information signals, disc-shaped optical recording media such as optical discs or magneto-optical discs have been proposed. Further, optical pick-up devices for carrying out write and read operations of information signals with respect to such disc-shaped optical recording media have been proposed. In addition, disc players having optical pick-ups and adapted for carrying out recording and reproduction of information signals with respect to disc-shaped optical recording media as described above have been proposed.

Such a disc-shaped optical recording medium has a structure including a transparent base (substrate) consisting of transparent material such as polycarbonate, and a signal recording layer deposited and formed on one principal surface portion of the transparent base. The optical pick-up includes a semiconductor laser serving as a light source, an object lens (objective) to which light beams emitted from the semiconductor laser are incident, and a photo-detector.

The light beams incident to the object lens are irradiated, in converged state, onto the signal recording surface of the disc-shaped optical recording medium by the object lens. In this case, these light beams are irradiated from the transparent base (substrate) side of the disc-shaped optical recording medium onto the disc-shaped optical recording medium, and are converged onto the signal recording surface which is the surface portion of the signal recording layer after being transmitted through the transparent base. This object lens is caused to undergo movement operation in the state supported by the bi-axial actuator to thereby converge the light beams onto the portion where information signal is recorded on the signal recording surface, i.e., a predetermined recording track. Such recording tracks are formed so as to take spiral shape on the principal surface portion of the disc-shaped optical recording medium.

In the disc-shaped optical recording medium, light beams are irradiated in the state converged after being passed through the object lens, whereby write or read operations of the information signal are carried out at the portion to which such light beams has been converged.

The light beam converged on the signal recording surface is caused to undergo modulation in light quantity or light polarization direction in dependency upon the information signal recorded on the signal recording surface and is reflected by the signal recording surface. The reflected light thus obtained returns to the object lens.

The reflected light beam reflected by the signal recording surface is received by the photo-detector after passed through the object lens. This photo-detector is a light receiving element such as a photo-diode, and serves to receive the reflected light beam which has been passed through the object lens to convert it into an electric signal. On the basis of the electric signal outputted from the photo-detector, reproduction of an information signal recorded on the disc-shaped optical recording medium is carried out.

Moreover, on the basis of the electric signal outputted from the photo-detector, a focus error signal indicating distance in the optical axis direction of the object lens between the focal point of the light beam by the object lens and the signal recording surface, and a tracking error signal indicating distance in the radial direction of the disc-shaped optical recording medium between the focal point and the recording track on the signal recording surface are generated. The biaxial actuator is controlled on the basis of the focus error signal and the tracking error signal to allow the object lens to undergo movement operation so that these respective error signals are converged to zero (0).

Meanwhile, since such a disc-shaped optical recording medium is used as an auxiliary memory (unit) for computer and/or recording medium for speech and picture signals, recording density of information signals is high.

In order to carry out write and read operations of information signals with respect to the disc-shaped optical recording medium of high recording density, it is necessary to allow the object lens to have greater numerical aperture (NA), and to allow the wavelength of light emitted of the light source to be shorter to reduce the diameter of the beam spot formed as the result of the fact that light beams are converged onto the disc-shaped optical recording medium.

However, when the numerical aperture of the object lens becomes greater, respective degrees of allowance of inclination of the disc-shaped optical recording medium, variations (unevenness) in thickness of the transparent base of the disc-shaped optical recording medium, and defocus (deviation in focal point) of the light beams on the disc-shaped optical recording medium are reduced. As a result, write and read operations of information signals with respect to the disc-shaped optical recording medium become difficult.

For example, when inclination (skew) with respect to the optical axis of the object lens of the disc-shaped optical recording medium takes place, wave front aberration in the light beam converged on the signal recording surface takes place, so electric signal (RF output) outputted from the photo-detector is affected.

In this wave front aberration, coma-aberration of the third order (cubic coma-aberration) produced in proportion to the third power of the numerical aperture of the object lens and approximately the first power of inclination angle (skew angle) of the disc-shaped optical medium is dominant. Accordingly, the allowed value with respect to the inclination of the disc-shaped optical recording medium is inversely proportional to third power of the numerical aperture of the object lens. Namely, when the numerical aperture becomes great, the allowed value becomes small.

In optical discs (discs like the so-called "compact discs") including a disc-shaped transparent base (substrate) having thickness of 1.2 mm and diameter of 80 mm or 120 mm and formed by polycarbonate, and widely used in general at present, there are instances where inclination of 0.5 to 1 takes place.

When the numerical aperture (NA) of the object lens is increased in such optical disc, wave front aberration as described above takes place in light beams irradiated onto the optical disc. As a result, the beam spot on the optical disc takes an asymmetrical form, and interference between codes takes place. Thus, precise signal reproduction becomes difficult.

The quantity of such cubic coma-aberration is proportional to the thickness of the transparent base (substrate) of the optical disc. For this reason, the thickness of the transparent base is made thinner (e.g., is caused to be 0.6 mm), thereby making it possible to reduce the cubic coma-aberration to one half. In the case where it is assumed that coma-aberration is caused to be decreased in this way, optical discs including the transparent base having thickness of 1.2 mm and optical discs including the transparent base having thickness of 0.6 mm would be used in mixed state as the above-mentioned optical disc.

Meanwhile, when plane parallel plate having thickness t is inserted into an optical path of a converged light beam converged by the object lens, there takes place spherical aberration proportional to t×(NA)4 in relation to the thickness t and numerical aperture NA of the object lens.

The object lens is designed so that this spherical aberration is corrected. Namely, since the quantity of the spherical aberration produced also varies when the thickness of the transparent base changes, the object lens is in conformity with the thickness of a predetermined transparent base.

Further, where an object lens designed to be in conformity with an optical disc including a transparent base having thickness of 0.6 mm is used to carry out recording and reproduction of information signals with respect to optical disc including a transparent base having thickness of 1.2 mm (e.g., "compact disc", write once type optical disc, or magneto-optical disc), such a difference of thickness between these transparent bases (0.6 mm) would be far beyond the allowed range of error of thickness of the transparent base with which the optical pick-up can cope. In this case, the object lens cannot correct spherical aberration taking place resulting from a difference of thickness of the transparent base, thus failing to carry out satisfactory recording and reproduction of information signals.

For this reason, an optical pick-up provided with two object lenses is conventionally proposed as disclosed in the Japanese Patent Application No. 354198/1995. As shown in FIG. 21, this optical pick-up has a structure in which a first object lens 105 and a second object lens 106 are attached on a single lens bobbin 104 of a biaxial actuator 103. In this optical pick-up, light beams emitted from a light source 107 are incident to any one of the first and second object lens 105, 106 through a collimator lens 111 and a mirror 112. The first and second object lenses 105, 106 have numerical aperture values different from each other. Further, the biaxial actuator 103 is disposed on a frame 108 within which the light source 107 is included.

In the disc player of the structure including this optical pick-up, an optical disc 101 of a first kind in which the thickness of the transparent base is, e.g., 0.6 mm, or an optical disc 102 of a second kind in which the thickness of the transparent base is, e.g., 1.2 mm is held by the disc table of which central portion is attached to the drive shaft of spindle motor (not shown), and is caused to undergo rotational operation. Further, the optical pick-up is supported so that it is permitted to undergo movement operation in the axial direction of a guide shaft 109 as indicated by arrow S in FIG. 21 by the guide shaft 109. This optical pick-up is caused to undergo movement operation in the radial direction of the optical disc 101 or 102 held on the disc table.

In this optical pick-up, when the optical disc 101 of the first kind is loaded on the disc table, the light source 107 is caused to be turned ON to carry out write and read operations of information signals with respect to the optical disc 101 of the first kind through the first object lens 105. On the other hand, when the optical disc 102 of the second kind is loaded on the disc table, the light source 107 is caused to be turned ON to carry out write and read operations of information signals with respect to the optical disc 102 of the second kind through the second object lens 106. Switching between the first and second object lenses 105, 106 on the optical path of light beams from the light source 107 is carried out by rotating the lens bobbin 104 about a support shaft 110 which supports this lens bobbin 104.

Further, the lens bobbin 104 of the biaxial actuator 103 is caused to undergo rotational operation about the support shaft 110 to thereby allow the respective object lenses 105, 106 to undergo movement operation in the tracking direction which is the direction substantially in parallel to the axial direction of the guide shaft 109 as indicated by arrow T in FIG. 21 to allow these object lenses 105, 106 to follow the recording tracks on the optical discs 101, 102.

However, in the write once type optical disc (so called "CD-R") including a transparent base having thickness of 1.2 mm, wavelength dependency at the time of aread operation of information signals is high. For this reason, in the case where there is used a light source of which wavelength of light emitted is caused to be short in order to allow the recording density of an information signal to be high, read-out operation of information signals is impossible. Namely, the signal recording layer of the so-called "CD-R" is formed by material of an organic pigment (coloring matter) system. For this reason, this signal recording layer absorbs light beams of which wavelength is short, e.g., light beams having a wavelength of 635 nm to 650 nm so that the reflection factor is lowered. Accordingly, it is impossible to carry out read (read-out) operation of information signals by light beams having short wavelength.

Accordingly, the present invention has been proposed in view of the above-described actual circumstances, and its object is to provide an optical pick-up including two object lenses so that write and read operations of information signals can be satisfactorily carried out with respect to disc-shaped optical recording media in which thicknesses of their transparent bases are different from each other, wherein even in the case where either object lens is used, the optical pick-up is capable of carrying out satisfactory detection of information signals, and can be used also with respect to disc-shaped optical recording media in which wavelength dependency at the time of read operation of information signals is high.

In addition, another object of this invention is to provide a disc player which is provided with optical pick-up featured above, and which is capable of carrying out recording and reproduction of information signals with respect to disc-shaped optical recording media in which thicknesses of their transparent bases are different from each other, and is capable of using disc-shaped optical recording media in which wavelength dependency at the time of read operation of information signals is high.

SUMMARY OF THE INVENTION

To solve the above-described problems, an optical pick-up according to this invention comprises: a frame permitted to relatively undergo movement operation with respect to a disc-shaped optical recording medium adapted so that the central portion thereof is held by a rotational operation mechanism and caused to undergo rotational operation by the rotational operation mechanism in a direction to come into contact with the central portion of the disc-shaped optical recording medium or to become away therefrom in parallel to the principal surface portion of the disc-shaped optical recording medium; first converging means disposed on the frame; a first light source disposed on the frame and adapted for light beams to be incident to the first converging means; a first photo-detector disposed on the frame and adapted for detecting light beams obtained by allowing light beams emitted from the first light source to be converged onto a signal recording surface of the disc-shaped optical recording medium by the first converging means to allow the converged light beam to be reflected by the signal recording surface; second converging means disposed on the frame; a second light source disposed on the frame and adapted for allowing light beams to be incident to the second converging means; and a second photo-detector disposed on the frame and adapted for detecting light beams obtained by allowing light beams emitted from the second light source to be converged onto the signal recording surface of the disc-shaped optical recording medium by the second converging means to allow the converged light beam to be reflected by the signal recording surface.

Moreover, in this invention, the first converging means is composed of a first object lens (objective) and a first actuator for supporting the first object lens so that it is permitted to undergo movement operation in a first tracking direction which is a direction perpendicular to the optical axis of the first object lens to allow the first object lens to be opposite to the disc-shaped optical recording medium. The second converging means is composed of a second object lens and a second actuator for supporting the second object lens in the state where the optical axis of the second object lens is caused to be in parallel to the optical axis of the first object lens and adapted to be permitted to undergo movement operation in a second tracking direction which is a direction perpendicular to the optical axis of the second object lens to allow the second object lens to be opposite to the disc-shaped optical recording medium.

Further, in this invention, at least the second tracking direction of the first and second tracking directions is such that angle with respect to normal line of recording track at position where the first or second object lens is opposite thereto corresponding to these tracking directions is caused to be angle closer to 0 than angle with respect to the normal line of movement direction of the frame when the object lens is opposite to the innermost circumferential portion of the signal recording area of the disc-shaped optical recording medium to irradiate light beams onto the signal recording surface of the disc-shaped optical recording medium in a direction substantially perpendicular thereto by either one of the first and second object lenses to converge them onto the signal recording surface, thus to carry out write or read operation of information signals with respect to the disc-shaped optical recording medium.

Further, in this invention, at least the second tracking direction of the first and second tracking directions is such that angle with respect to normal line of recording track at position where the first or second object lens is opposite thereto corresponding to these tracking directions becomes equal to 0 when the object lens is opposite to position between the innermost circumferential portion and the outermost circumferential portion of the signal recording area of the disc-shaped optical recording medium.

Further, in this invention, at least the second tracking direction of the first and second tracking directions is such that angle with respect to normal line of recording track at position where the first or second object lens is opposite thereto corresponding to these tracking directions when the object lens is opposite to the innermost circumferential portion of the signal recording area of the disc-shaped optical recording medium and angle with respect to normal line of recording track when the object lens is opposite to the outermost circumferential portion of the signal recording area of the disc-shaped optical recording medium are equal to angles (values) substantially equal to each other.

Further, in this invention, the first and second object lenses are arranged in the radial direction of the disc-shaped optical recording medium which is relative movement direction between the frame and the disc-shaped optical recording medium. In this case, the numerical aperture of the first object lens is greater than the numerical aperture of the second object lens, and the first object lens is disposed at the inner circumferential side of the disc-shaped optical recording medium relative to the second object lens.

Further, an optical pick-up according to this invention comprises: a frame permitted to relatively undergo movement operation with respect to a disc-shaped optical recording medium adapted so that the central portion thereof is held by a rotational operation mechanism and caused to undergo rotational operation by the rotational operation mechanism in a direction to come into contact with the central portion of the disc-shaped optical recording medium or to become away therefrom in parallel to the principal surface portion of the disc-shaped optical recording medium; first converging means composed of a first object lens and a first actuator for supporting the first object lens so that it is permitted to undergo movement operation in a first tracking direction which is a direction perpendicular to the optical axis of the first object lens to allow the first object lens to be opposite to the disc-shaped optical recording medium, the first converging means being disposed on the frame; a first light source disposed on the frame and adapted for allowing light beams to be incident to the first converging means; a first photo-detector disposed on the frame and adapted for detecting light beams obtained by allowing light beams emitted from the first light source to be converged onto a signal recording surface of the disc-shaped optical recording medium by the first converging means to allow the converged light beam to be reflected by the signal recording surface; second converging means composed of a second object lens having numerical aperture smaller than that of the first object lens, and a second actuator for supporting the second object lens so that it is permitted to undergo movement operation in a second tracking direction which is a direction perpendicular to the optical axis of the second object lens to allow the second object lens to be opposite to the disc-shaped optical recording medium, the second converging means being disposed on the frame; a second light source disposed on the frame and adapted for allowing light beams having wavelength longer than that of light beams that the first light source emits to be incident to the second converging means; and a second photo-detector disposed on the frame and adapted for detecting light beams obtained by allowing light beams emitted from the second light source to be converged onto the signal recording surface of the disc-shaped optical recording medium by the second converging means to allow the converged light beam to be reflected by the signal recording surface, wherein the first and second converging means are disposed on planes flush with each other.

Further, in accordance with this invention, in the above-described optical pick-up, when the frame is caused to relatively undergo movement operation in a direction to come into contact with the central portion of the disc-shaped optical recording medium or to become away therefrom, either one of the first and second object lenses is moved in the state opposite to line passing through the center of the disc-shaped optical recording medium and in parallel to relative movement direction between the frame and the disc-shaped optical recording medium. Moreover, in this case, one of the first and second tracking directions is in correspondence with the radial direction of the disc-shaped optical recording medium, and the other of the first and second tracking directions is inclined with respect to the radial direction of the disc-shaped optical recording medium. Further, in this case, at least the second tracking direction of the first and second tracking directions is such that angle with respect to normal line of recording track at the position where the first or second object lens is opposite thereto corresponding to these tracking directions when the object lens is opposite to the innermost circumferential portion of the signal recording area of the disc-shaped optical recording medium and angle with respect to normal line of recording track when the object lens is opposite to the outermost circumferential portion of the signal recording area of the disc-shaped optical recording medium are angles (values) substantially equal to each other.

Further, in accordance with this invention, in the above-described optical pick-up, the first light source and the second light source respectively emit light beams having wavelengths different from each other. In this case, the wavelength of light beams that the first light source emits is 635 nm to 650 nm, and the wavelength of light beams that the second light source emits is 780 nm.

Further, in accordance with this invention, in the above-described optical pick-up, the numerical aperture of the first object lens is greater than the numerical aperture of the second object lens. In this case, the numerical aperture of the first object lens is 0.6 and the numerical aperture of the second object lens is 0.45.

Further, in accordance with this invention, in the above-described optical pick-up, the first and second converging means are arranged in the circumferential direction of the disc-shaped optical recording medium, and are disposed in a manner close to each other in the state where line passing through the center of the disc-shaped optical recording medium and in parallel to relative movement direction between the frame and the disc-shaped optical recording medium is put therebetween.

Further, in accordance with this invention, in the above-described optical pick-up, the first actuator comprises a supporting member for movably supporting the first object lens, and magnetic circuit adapted to apply, to the first object lens, drive force for allowing the first object lens to be moved in the optical axis direction and in the direction perpendicular to the optical axis; and the second actuator comprises a supporting member for movably supporting the second object lens, and magnetic circuit for applying, to the second object lens, drive force for allowing the second object lens to be moved in the optical axis direction and in the direction perpendicular to the optical axis.

Further, a disc player according to this invention comprises: a rotational operation mechanism adapted for holding the central portion of a disc-shaped optical recording medium to allow the disc-shaped optical recording medium to undergo rotational operation; a frame supported so that it is permitted to relatively undergo movement operation with respect to the disc-shaped optical recording medium caused to undergo rotational operation by the rotational operation mechanism in a direction to come into contact with the central portion of the disc-shaped optical recording medium or to become away therefrom in parallel to the principal surface portion of the disc-shaped optical recording medium; a movement operation mechanism for allowing the disc-shaped optical recording medium or the frame to relatively undergo movement operation in a radial direction of the disc-shaped optical recording medium; first converging means disposed on the frame; a first light source disposed on the frame and adapted for allowing light beams to be incident to the first converging means; a first photo-detector disposed on the frame and adapted for detecting light beams obtained by allowing light beams emitted from the first light source to be converged onto a signal recording surface of the disc-shaped optical recording medium by the first converging means to allow the converged light beam to be reflected by the signal recording surface; second converging means disposed on the frame; second converging means disposed on the frame; a second light source disposed on the frame and adapted for allowing light beams to be incident to the second converging means; a second photo-detector disposed on the frame and adapted for detecting light beams obtained by allowing light beams emitted from the second light source to be converged onto the signal recording surface of the disc-shaped optical recording medium by the second converging means to allow the converged light beam to be reflected by the signal recording surface; and switching means for carrying out switching between the first and second light sources in correspondence with kind of the disc-shaped optical recording medium caused to undergo rotational operation by the rotational operation mechanism, thus to carry out recording or reproduction of information signals with respect to the disc-shaped optical recording medium.

Accordingly, in the disc player according to this invention, since angle formed by the tracking direction which is the direction in which the biaxial actuator allows the object lens to undergo movement operation and the normal line of the recording track on the disc-shaped optical recording medium at the position where the object lens is opposite thereto can be held down to small value, it is possible to precisely detect the tracking error signal. Moreover, since there is less change at the inner and outer circumferential portions of the disc-shaped optical recording medium of angle formed by the tracking direction and the normal line of the recording track, there is resultantly less change (fluctuation) at the inner and outer circumferential portions of the disc-shaped optical recording medium of detection accuracy of the tracking error signal. Thus, control of the biaxial actuator is easy.

Namely, this invention can provide a disc player provided with an optical pick-up including two object lenses so as to have ability of satisfactorily carrying out recording and reproduction of information signals with respect to disc-shaped optical recording media in which thicknesses of the transparent bases are different from each other, thus making it possible to satisfactorily carry out detection of the tracking error signal even in the case where either of the object lenses is used.

Further, in the disc player according to this invention, when the frame is caused to relatively undergo movement operation in a direction to come into contact with the central portion of the disc-shaped optical recording medium or to become away therefrom, it moves either one of the first and second object lenses in the state opposite to line passing through the center of the disc-shaped optical recording medium and in parallel to relative movement direction between the frame and the disc-shaped optical recording medium.

Further, in accordance with this invention, the first light source and the second light source respectively emit light beams having wavelengths different from each other. In this case, the wavelength of light beams that the first light source emits is 635 nm to 650 nm, and the wavelength of light beams that the second light source emits is 780 nm.

Further, in accordance with this invention, the first converging means is composed of first object lens and first actuator for supporting the first object lens so that it is permitted to undergo movement operation in the first tracking direction which is the direction perpendicular to the optical axis of the first object lens to allow the first object lens to be opposite to the disc-shaped optical recording medium; and the second converging means comprises second object lens and second actuator for supporting the second object lens in the state where the optical axis of the second object lens is caused to be in parallel to the optical axis of the first object lens to permit the second object lens to undergo movement operation in the second tracking direction which is the direction perpendicular to the optical axis of the second object lens to allow the second object lens to be opposite to the disc-shaped optical recording medium.

Further, in accordance with this invention, the numerical aperture of the first object lens is greater than the numerical aperture of the second object lens.

In addition, in this invention, there is provided tilting mechanism for tilting emitting direction of light beams from the object lens in correspondence with inclination of the signal recording surface of the disc-shaped optical recording medium.

DETAILED DESCRIPTION OF THE PREFERRED EMBODIMENTS

The invention will now be described with reference to the attached drawings in the order as shown below.

[1] Kind of the disc-shaped optical recording medium

[2] Support of the optical pick-up

[3] Configuration of the biaxial actuator (object lens drive unit)

[4] Configuration within the frame

[5] Configuration of the disc player

[1] Kind of the Disc-Shaped Optical Recording Medium

Figure 3:
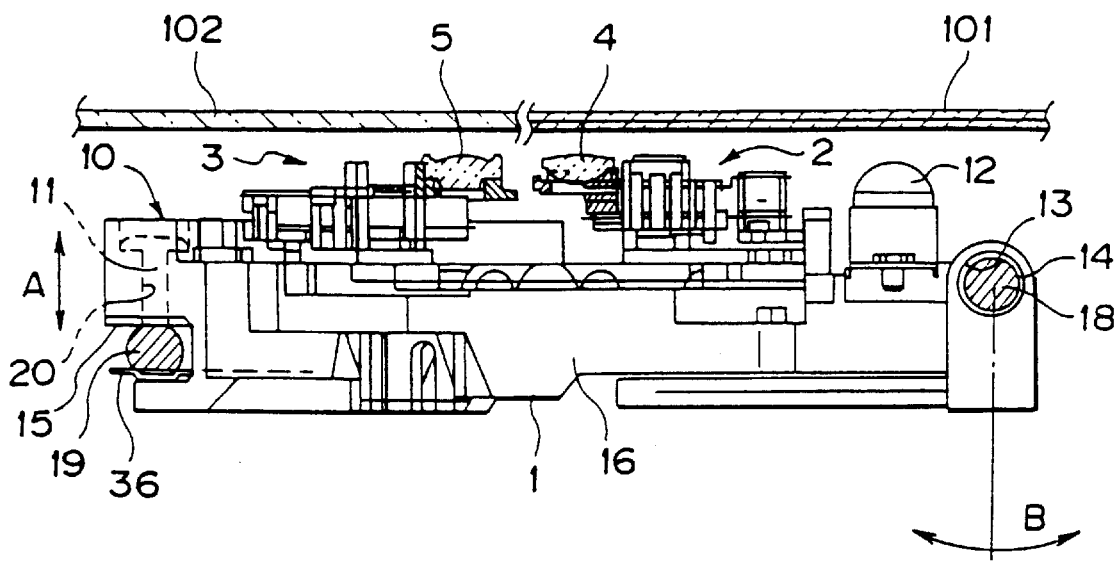
FIG. 3 is a front view showing the configuration of the optical pick-up.

In the mode for carrying out the invention disclosed here, the optical pick-up according to this invention is constituted, as shown in FIG. 3, as a device adapted for irradiating laser beams with respect to both an optical disc 101 of the first kind which is a disc-shaped optical recording medium in which thickness of the transparent base (substrate) is 0.6 mm and an optical disc 102 of the second kind which is a disc-shaped optical recording medium in which thickness of the transparent base is 1.2 mm to thereby carry out write and read operations of information signals.

The optical disc 101 includes a disc-shaped transparent base formed by polycarbonate having a thickness of 0.6 mm and a diameter of 120 mm, and a signal recording layer formed on one principal surface of the transparent base. This optical disc 101 of the first kind is composed of two optical discs with their signal recording layers being stuck to each other to constitute a disc body having thickness of 1.2 mm, i.e., a double sided optical disc.

This optical disc 101 of the first kind is capable of carrying out write and read operations of information signals through an object lens (objective) having numerical aperture (NA) of 0.6 by laser beams having wavelength of 635 nm (or 650 nm) which is the first wavelength. At the signal recording layer, information signals are recorded along recording tracks formed in a spiral form.

An optical disc which corresponds to such optical disc 101 of the first kind, e.g., the so-called "Digital Video Disc (DVD)" (trade name) has been proposed.

The optical disc 102 of the second kind includes a disc-shaped transparent base formed by polycarbonate having thickness of 1.2 mm and diameter of 80 mm or 120 mm, and a signal recording layer formed on one principal surface portion of the transparent base.

The optical disc 102 of the second kind is capable of carrying out write and read operations of information signals through an object lens having a numerical aperture of 0.45 by laser beams having a wavelength of 780 nm, which is the second wavelength. At the signal recording layer, information signals are recorded along recording tracks formed in a spiral form.

Figure 6:
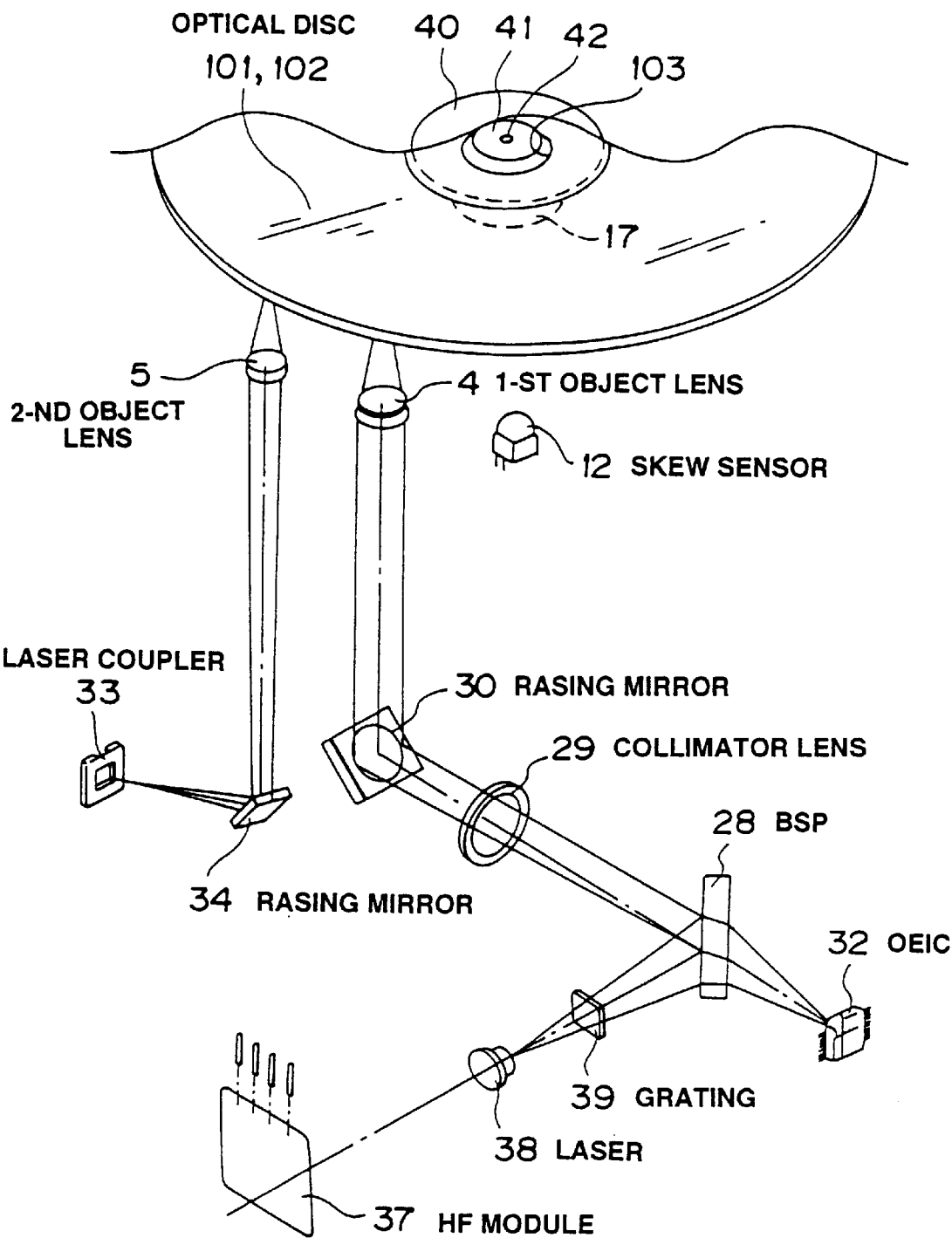
FIG. 6 is a perspective view showing the configuration of optical system in the optical pick-up.

As an optical disc which corresponds to such optical disc 102 of the second kind, e.g., the so-called "Compact Disc (CD)" (trade name) and the so-called "CD-ROM", "CD-R" have been proposed. These optical discs 101, 102 of the first kind and the second kind are caused to undergo rotational operation by a spindle motor 17 constituting a rotational operation mechanism attached to chassis (not shown), as shown in FIG. 6, in the disc player according to this invention. A disc table 40 constituting the rotational operation mechanism is attached to a drive shaft 42 of the spindle motor 17. This disc table 40 is formed so that it takes a substantially disc shape, and includes a substantially circular truncated cone shaped projection 41 on the central portion of the upper surface portion thereof. This disc table 40 is constituted so that when the central portion of each optical disc 101 or 102 is mounted thereon, the central portion of the optical disc 101 or 102 is held in a manner to fit the projection 41 into a chucking hole 103 provided at the central portion of the optical disc 101 or 102. Namely, each of the optical discs 101 and 102 is held on the disc table 40, and is caused to undergo rotational operation along with the disc table 40 by the spindle motor 17.

[2] Support of the Optical Pick-Up

Figure 2:
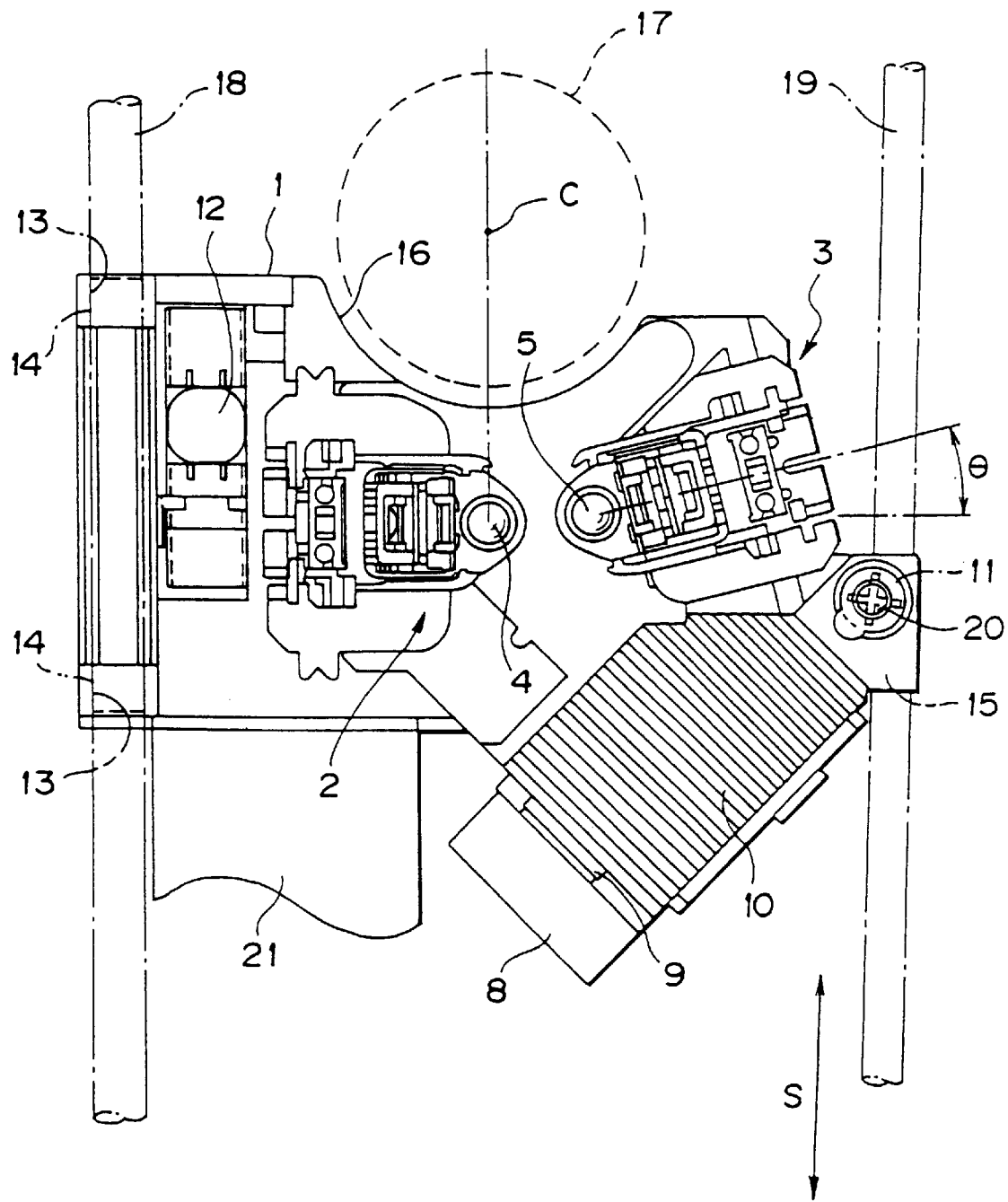
FIG. 2 is a plan view showing the configuration of the optical pick-up.

As shown in FIG. 2, the optical pick-up is caused to be of structure including a frame 1 movably supported by a guide shaft 18 and a support shaft 19 disposed on the chassis. The guide shaft 18 and the support shaft 19 are caused to be in parallel to each other, and are parallel to the upper surface portion of the disc table 40.

Figure 1:
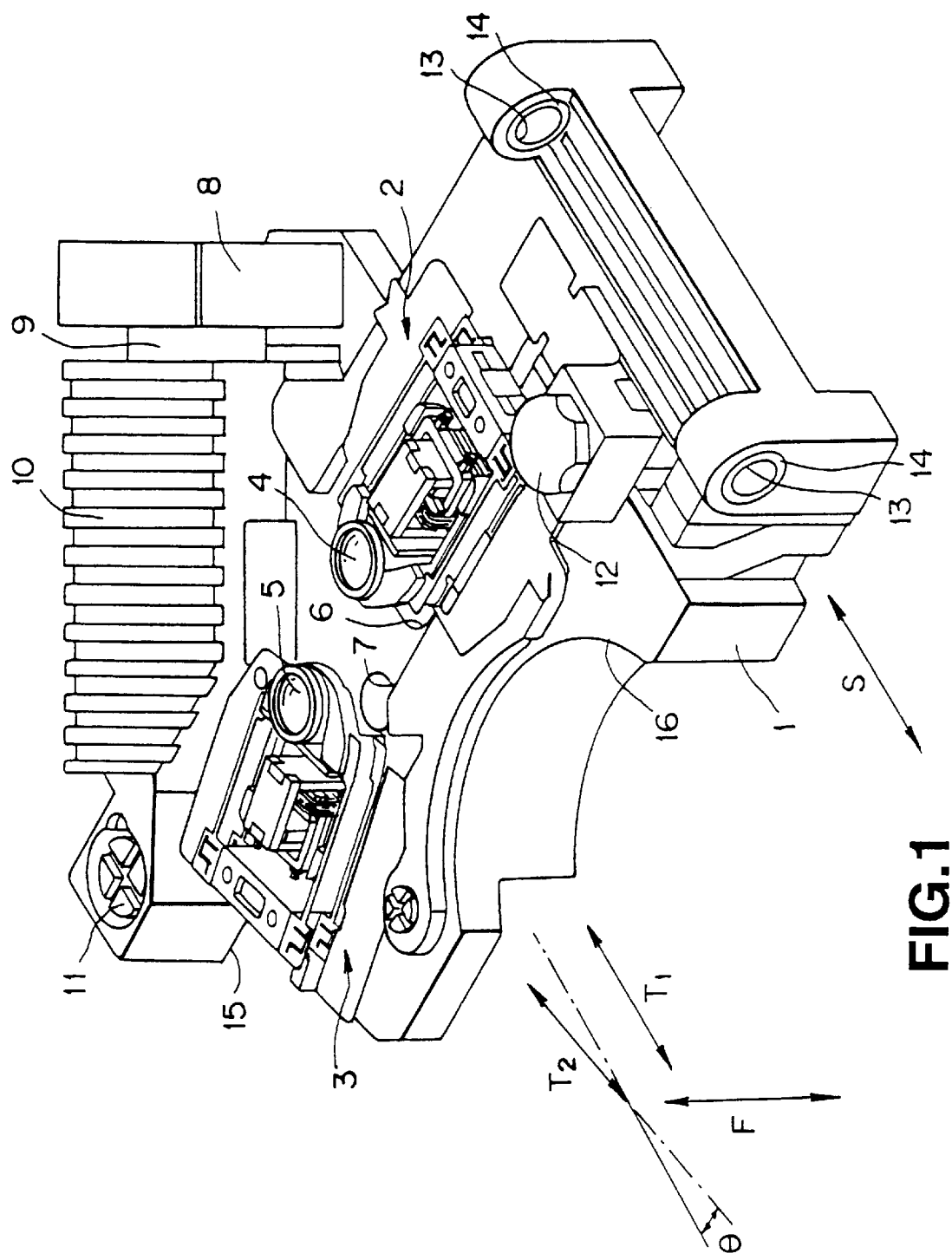
FIG. 1 is a perspective view showing the configuration of an optical pick-up according to this invention.

The frame 1 includes, as shown in FIG. 1, guide holes 13, 13 through which the guide shaft 18 is inserted, and a support groove portion 15 into which the support shaft 19 is inserted. This frame 1 is caused to undergo movement operation along the guide shaft 18 and the support shaft 19, whereby it is moved, in the state where the upper surface portion is opposed to the principal surface portion of each of optical discs 101, 102 loaded on the disc table 40, in a direction to come into contact with the spindle motor 17 or to become away therefrom, i.e., in the radial direction of the optical discs 101, 102. This frame 1 is caused to undergo movement operation by a sled motor disposed on the chassis.

The bottom surface portion within the support groove portion 15 is constituted by a leaf spring 36 attached to the frame 1. Within the range from the upper surface portion of the frame 1 into the support groove portion 15, a screw hole 20 is provided in the state positioned at the upper side of the leaf spring 36. An angle adjustment screw 11 is screwed and inserted into the screw hole 20 from the upper side of the frame 1. This angle adjustment screw 11 allows the front end side to be admitted (advanced) into the support groove portion 15 in dependency upon screw quantity into the screw hole 20 to allow the front end portion to come into contact with the upper surface portion of the support shaft 19. The frame 1 is adapted to rotate the angle adjustment screw 11 as indicated by arrow A in FIG. 3, to adjust screw quantity into the screw hole 20, whereby the frame 1 is caused to undergo rotational adjustment with the axis of the guide shaft 18 being centered as indicated by arrow B in FIG. 3 thus adjusting inclination angle with respect to the spindle motor 17.

With respect to the positional relationship between the frame 1 and the spindle motor 17, i.e., the positional relationship between the frame 1 and the optical discs 101, 102, the spindle motor 17 is fixed and the frame 1 is caused to undergo movement operation, there may be employed, in a manner opposite to the above, a configuration (modification) such that the frame 1 is fixed and the spindle motor 17 is caused to undergo movement operation. In addition, there may be employed a configuration (modification) such that both the frame 1 and the spindle motor 17 are caused to respectively undergo movement operation.

[3] Configuration of the Biaxial Actuator (Object Lens Drive Unit)

Meanwhile, the transparent bases of the optical discs 101, 102 are formed in a flat plate form, but there are instances where slight deformation may take place. For this reason, when such an optical disc is caused to undergo rotational operation in the state where the central portion thereof is held by the disc table 40, the so-called plane vibration takes place. Namely, when the optical disc 101 or 102 is caused to undergo rotational operation in the state where the central portion thereof is held, the signal recording layer of each optical disc 101 or 102 periodically moves in the direction to come into contact with the optical pick-up or to become away therefrom. Moreover, recording tracks of each optical disc 101, 102 are formed so that the center of curvature is in correspondence with the center of the transparent base (substrate), but there are instances where they are subject to eccentricity to a slight degree. For this reason, when the transparent base (the optical disc) is caused to undergo rotational operation in the state where the central portion thereof is held, those recording tracks periodically move in the radial direction of each optical disc 101, 102.

Figure 5:
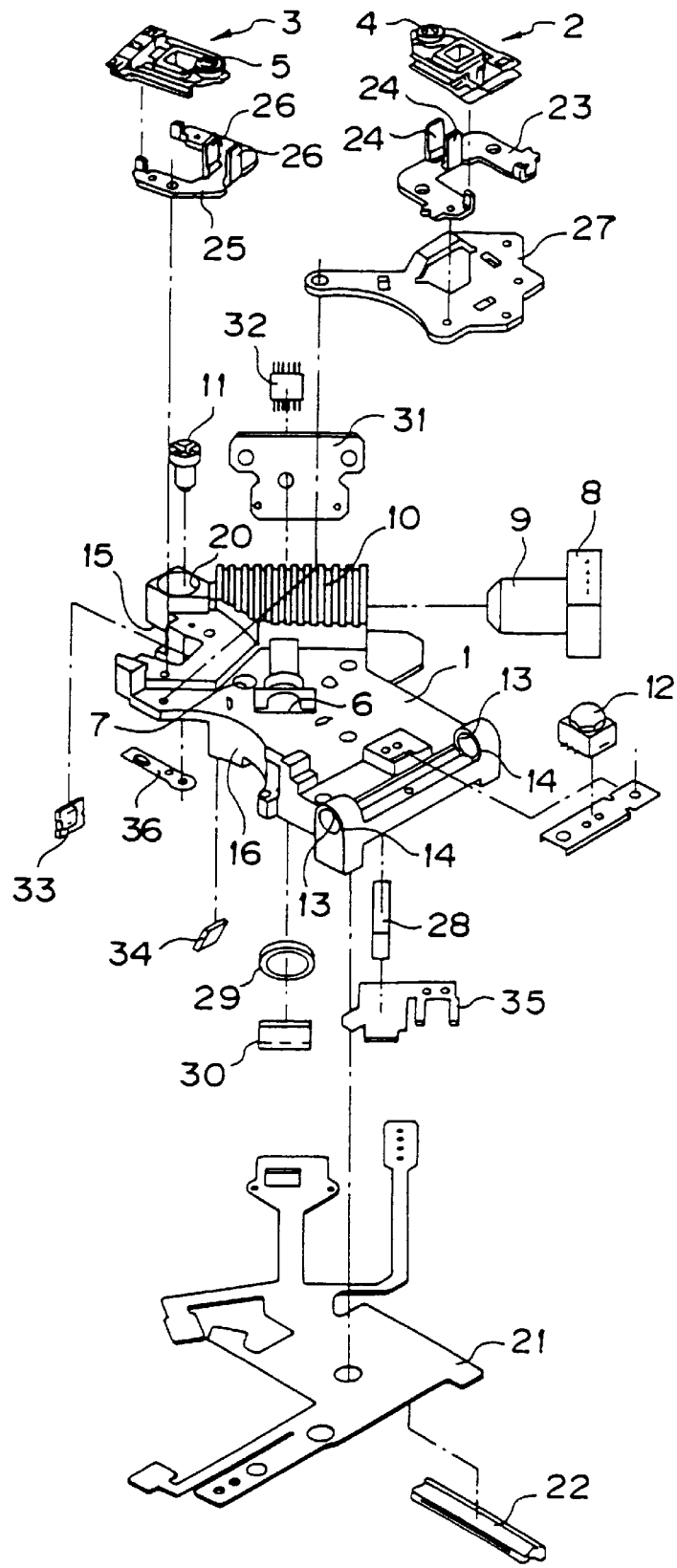
FIG. 5 is an exploded perspective view showing the configuration of the optical pick-up.

In order to follow laser beams for carrying out write and read operations of information signals with respect to these optical discs 101, 102 even in the case where movement of recording tracks by plane vibration or eccentricity of such optical discs 101, 102 takes place, the optical pick-up according to this invention includes first and second biaxial actuators 2, 3 as shown in FIG. 1. These biaxial actuators 2, 3 are attached on the upper surface portion of the frame 1 as shown in FIG. 5.

The first biaxial actuator 2 supports the first object lens 4 so that it is permitted to undergo movement operation in the optical axis direction of the first object lens 4, i.e., in the focus direction indicated by arrow F in FIG. 1 and in the direction perpendicular to the optical axis, i.e., in the tracking direction indicated by arrow T1 in FIG. 1. The first object lens 4 has numerical aperture of 0.6.

Moreover, the second biaxial actuator 3 supports the second object lens 5 so that it is permitted to undergo movement operation in the optical axis direction of the second object lens 5 (i.e., in the focus direction indicated by arrow F in FIG. 1) and in the direction perpendicular to the optical axis (i.e., in the second tracking direction indicated by arrow T2 in FIG. 1). The second object lens 5 has numerical aperture of 0.45.

These object lenses 4, 5 are opposed to the signal recording layer of each of the optical discs 101, 102 loaded on the disc table 40, and the frame 1 is caused to undergo movement operation along the guide shaft 18 and the support shaft 19, whereby they are caused to undergo movement operation along the inner and outer circumferential directions of each of the optical discs 101, 102 as indicated by arrow S in FIG. 2. The first and second object lenses 4, 5 are arranged in the direction substantially perpendicular to length direction of the guide shaft 18, i.e., in the circumferential direction of each of the optical discs 101, 102 loaded on the disc table 40. In addition, the first and second object lenses 4, 5 are supported in the state where their optical axes are caused to be in parallel to each other.

Figure 7:
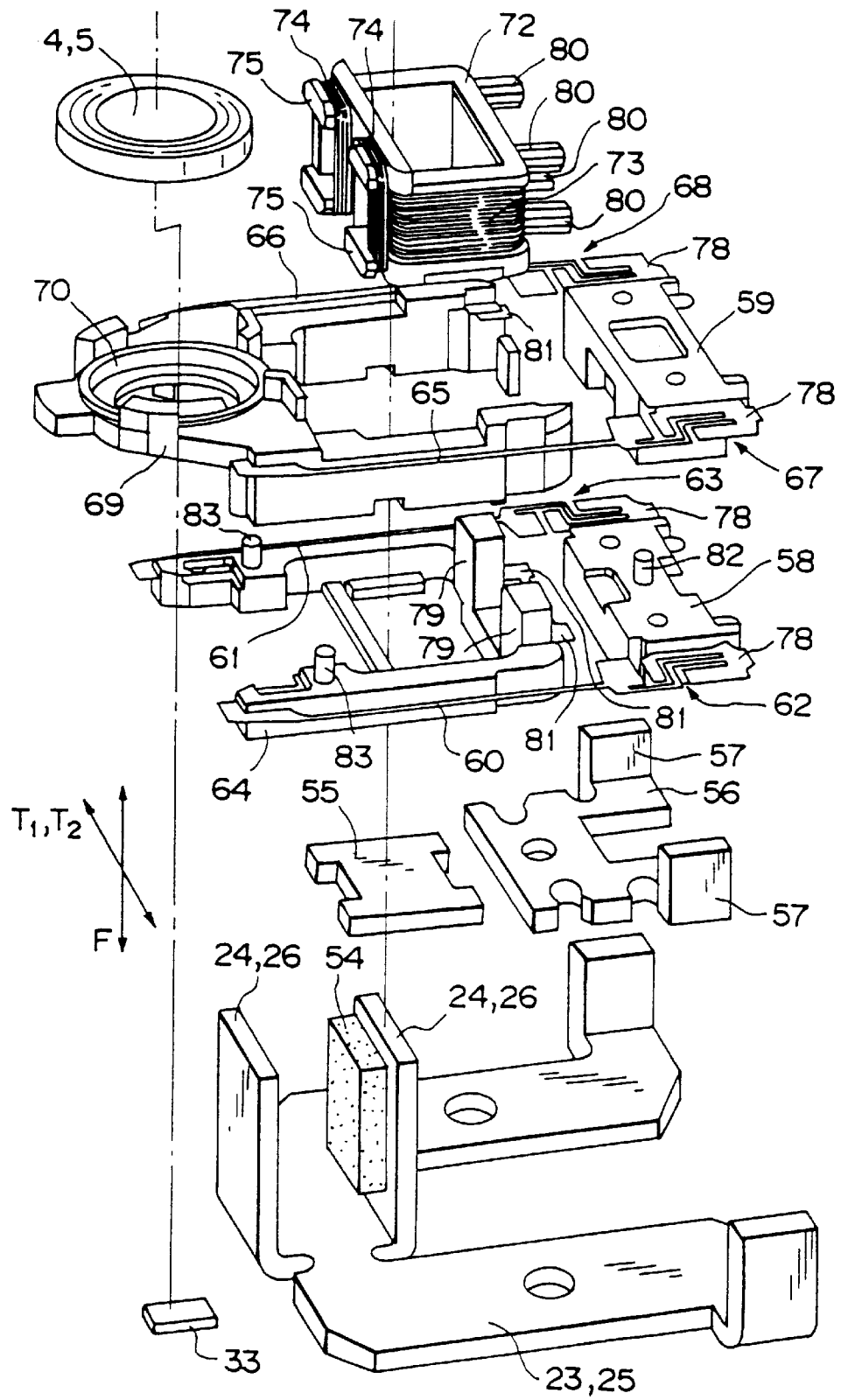
FIG. 7 is an exploded perspective view showing the configuration of biaxial actuator provided at the optical pick-up.

The biaxial actuators 2, 3 respectively include, as shown in FIG. 7, pedestal (base) portions 23, 25 fixedly disposed on the frame 1. Further, these biaxial actuators 2, 3 include a lens bobbin body portion 69 serving as a movable portion on which the object lenses 4, 5 are attached. This lens bobbin body portion 69 is formed by synthetic resin material so as to take frame shape, and is provided at the front end side portion thereof with an object lens attachment hole 70 into which the object lenses 4, 5 are fitted. At this object lens attachment hole 70, the object lenses 4, 5 are attached in the state fitted whereinto from the upper side. This lens bobbin body portion 69 is adapted so that both side side portions are supported with respect to an upper side fixed block 59 through a pair of leaf spring members 65, 66 serving as elastic member.

These leaf spring members 65, 66 are integrally formed by metal material having suitable elasticity such as phosphor bronze so as to take a thin elongated plate shape. The lens bobbin body portion 69 and the upper side fixed block 59 and the respective leaf spring members 65, 66 are connected in the state where the front end side portions and the base end side portions of the respective leaf spring members 65, 66 are buried within the lens bobbin body portion 69 and the upper side fixed block 59 by the so-called out-sert molding. The base end portions of these leaf spring members 65, 66 are projected toward the backward side as connection terminal from the back end surface of the upper side fixed block 59. Moreover, the front end portions of these leaf spring members 65, 66 are connected to a terminal plate embedded within the lens bobbin body portion 69 and adapted so that the back end portion is projected toward the backward side as a connection terminal 81 from the back end surface of the lens bobbin body portion 69.

Moreover, at the lower surface portion of the lens bobbin body portion 69, a bobbin support frame 64 is attached. This bobbin support frame 64 is formed by material similar to the lens bobbin body portion 69 so as to take frame shape to support the both side side portions of the lens bobbin body portion 69. This bobbin support frame 64 is adapted so that a pair of positioning projections 83, 83 are projected on the upper surface portion. The bobbin support frame 64 is caused to undergo positioning with respect to the lens bobbin body portion 69 by these positioning projections 83, 83 and is bonded to the lens bobbin body portion 69 by adhesive agent so that it is fixed. This bobbin support frame 64 is adapted so that the both side side portions thereof are supported with respect to a lower side fixed block 58 through a pair of leaf spring members 60, 61 serving as elastic member.

These leaf spring members 60, 61 are integrally formed by metal material having suitable elasticity such as phosphor bronze so as to take thin elongated plate form. The bobbin support frame 64 and the lower side fixed block 58 and the respective leaf spring members 60, 61 are connected in the state where the front end side portions and the base end side portions of the respective leaf spring members 60, 61 are embedded within the bobbin support frame 64 and the lower side fixed block 58 by the so-called out-sert molding. The base end portions of these leaf spring members 60, 61 are projected toward the backward side as connection terminal from the back end surface of the lower side fixed block 58. Moreover, the front end portions of these leaf spring members 60, 61 are connected to a terminal plate embedded within the bobbin support frame 64 and adapted so that the backward end portion is projected toward the backward side as connection terminal 81 from the backward end surface of the bobbin support frame 64.

The lower side fixed block 58 and the upper side fixed block 59 are disposed in the state fixed on the pedestal (base) portions 23, 25 through a fixed plate 56. Namely, the lower side fixed block 58 is bonded by adhesive agent on the fixed plate 56 so that it is fixed, the upper side fixed block 59 is bonded by adhesive agent on the lower side fixed block 58 so that it is fixed, and the fixed plate 56 is adhered (or soldered) by adhesive agent with respect to the base (pedestal) portions 23, 25 so that it is fixed. Thus, the fixed portion is constituted. In this example, at the both side side portions of the fixed plate 56, positioning projecting pieces 57, 57 for allowing the lower side fixed block 58 to undergo positioning are projected. In addition, at the upper surface portion of the lower side fixed block 58, a positioning projection 82 for allowing the upper side fixed block 59 to undergo positioning is provided.

The leaf spring members 60, 61, 65, 66 respectively include linear portion & crank portions 62, 63, 67, 68, wherein their base end sides are attached to the fixed portion comprised of the respective fixed blocks 58, 59 and their front end sides are attached to the lens bobbin body portion 69 or the bobbin support frame 64. These leaf spring members 60, 61, 65, 66 are adapted so that the respective linear portions are caused to be substantially in parallel to each other and adapted for supporting the lens bobbin body portion 69 and the bobbin support frame 64 so that they are permitted to undergo displacement with respect to the fixed portion. Further, the crank portions 62, 63, 67, 68 are provided at the base end side portions of the respective leaf spring members 60, 61, 65, 66, and are formed in the state including respectively two bent portions of 90° in directions opposite to each other. In addition, at these leaf spring members 60, 61, 65, 66, a displacement limiting piece portion 78 is provided to surround both sides of the base end sides and the intermediate portions of the crank portions 62, 63, 67, 68.

Further, at the bobbin support frame 64 and the lens bobbin body portion 69, a coil bobbin 72 is attached. This coil bobbin 72 is formed so as to take a hollow square pole shape in which the upper side and the lower side are opened. This coil bobbin 72 is fitted into through-hole provided substantially at the central portion of the lens bobbin body portion 69 and the bobbin support frame 64, and is fixed with respect to the lens bobbin body portion 69 and the bobbin support frame 64 in the state bonded thereto by adhesive agent after having undergone positioning by a pair of positioning projecting pieces 79, 79 projected on the upper surface portion of the bobbin support frame 64.

At the coil bobbin 72, a focus coil 73 and tracking coils 74, 74 are attached. The focus coil 73 is wound with respect to the side surface portion (outer circumferential portion) of the coil bobbin 72, and is adapted to allow the center axis of the coil to be in parallel to the optical axes of the object lenses 4, 5. The tracking coils 74, 74 are constituted so that they are respectively wound on tracking coil bobbins 75, 75, and is attached to the coil bobbin 72 by allowing these tracking coil bobbins 75, 75 to be attached to the front end surface portion of the coil bobbin 72. These tracking coils 74, 74 are adapted so that center axes of coils are caused to be in parallel to each other, the center axes are caused to be in parallel to linear portions of the respective leaf spring members 60, 61, 65, 66, and the center axes are caused to be in a direction perpendicular to the optical axis of each object lenses 4, 5.

Drawing lines of winding start and winding end of the respective coils 73, 74, 74 are connected in correspondence with four terminal rods 80, 80, 80, 80 projected toward the backward side of the coil bobbin 72. Further, these terminal roads 80, 80, 80, 80 are connected by soldering in correspondence with respective connection terminals 81, 81, 81, 81 projected toward the backward side from the backward end surface of the lens bobbin body portion 69 and the bobbin support frame 64 of the terminal plate embedded within the lens bobbin body portion 69 and the bobbin support frame 64.

The lens bobbin body portion 69, the bobbin support frame 64 and the coil bobbin 72 respectively constitute lens bobbins of the biaxial actuators 2, 3.

Further, respective pairs of yokes 24, 24, 26, 26 positioned before and after are vertically provided integrally with the pedestal (base) portions 23, 25 on the pedestal portions 23, 25. These pedestal portions 23, 25 and the respective yokes 24, 24, 26, 26 are formed by magnetic material (high permeability material) such as iron. The yokes 24, 26 of the backward side are admitted into the hollow portion within the coil bobbin 72 from the lower side. At the front portions of the yokes 24, 26 of the backward side, magnet 54 is attached by an adhesive agent. The yokes 24, 26 of the front side are admitted into through-hole at the central portion of the bobbin support frame 64 and the lens bobbin body portion 69 from the lower side, and are positioned at the front side of the coil bobbin 72, i.e., at the front side of the respective tracking coils 74, 74. Further, the upper end portions of the respective yokes 24, 24, 26, 26 are connected to each other through a connecting plate 55. This connecting plate 55 is formed by magnetic material (high permeability material) such as iron similarly to the respective yokes 24, 24, 26, 26.

In the first biaxial actuator 2, the first object lens 4 is supported so that it can be moved in two directions which are the optical axis direction of the first object lens 4, i.e., the focus direction indicated by arrow F in FIG. 7, and the direction perpendicular to the optical axis, i.e., the first tracking direction indicated by arrow T1 in FIG. 1, and is caused to undergo movement operation in the above-mentioned two directions by electromagnetic force produced between the respective coils 73, 74, 74 and the magnet 54.

Moreover, in the second biaxial actuator 3, the second object lens 5 is supported so that it can be moved in two directions which are the optical axis direction of the second object lens 5, i.e., the focus direction indicated by arrow F in FIG. 7, and the direction perpendicular to the optical axis, i.e., the second tracking direction indicated by arrow T2 in FIG. 1, and is caused to undergo movement operation in the above-mentioned two directions by electromagnetic force produced between the respective coils 73, 74, 74 and the magnet 54.

In the optical discs 101, 102, as described above, the recording tracks are formed in spiral form on the signal recording layer. In this optical disc, information signals are written along the recording tracks. These biaxial actuators 2, 3 allow the object lenses 4, 5 to undergo movement so as to allow the object lenses 4, 5 to follow displacement of the optical disc 101 or 102. Namely, the optical pick-up converges, at all times, light beams which have been transmitted through the object lenses 4, 5 with respect to the position at which information signal is to be written on the signal recording layer of the optical disc.

This optical pick-up is opposed to each of the optical discs 101, 102 held on the disc table 40 at the chucking hole 103 and is caused to undergo rotational operation by the spindle motor 17, and is caused to undergo movement operation in the radial direction of each of the optical discs 101, 102 to thereby carry out, while it is moved along the recording tracks as relative positions of each of the optical discs 101, 102, a write or read operation of information signal with respect to the recording track. Accordingly, this optical pick-up must allow the converging position of laser beam by the object lenses 4, 5 to follow displacement of the position of the recording track by plane vibration and eccentricity of the optical disc. For this reason, the respective biaxial actuators 2, 3 allow the object lenses 4, 5 to undergo movement operation in the focus direction and in the respective tracking directions.

In these biaxial actuators 2, 3, focus drive current is delivered to the focus coil 73 through connection terminals projected from the backward end surfaces of the respective fixed blocks 58, 59, the respective leaf spring members 60, 61, 65, 66 and the respective terminal plates, whereby the lens bobbin body portion 69 is caused to undergo movement operation in the focus direction as indicated by arrow F in FIG. 7. Moreover, in these biaxial actuators 2, 3, tracking drive current is delivered to the tracking coils 74, 74 through connection terminals projected from the backward end surfaces of the respective fixed blocks 58, 59, the respective leaf spring members 60, 61, 65, 66 and the respective terminal plates, whereby the lens bobbin body portion 69 is caused to undergo in the respective tracking directions as indicated by arrows T1, T2 in FIG. 7.

In these biaxial actuators, the focus drive current and the tracking drive current are delivered on the basis of error signal (focus error signal and tracking error signal) indicating deviation quantity between the focusing position of the laser beam by the object lenses 4, 5 and the recording track. Accordingly, these biaxial actuators 2, 3 carry out periodical movement operation with respect to the object lenses 4, 5 in synchronism with the rotation period of each of the optical discs 101, 102.

The laser beam converged on the signal recording layer is modulated in reflection intensity or polarization direction, at the signal recording layer, in dependency upon information signal written at the signal recording layer, and the modulated light beam thus obtained is reflected. The reflected light beam which has been reflected on the signal recording layer returns to the object lenses 4, 5 and is received by photo-detector disposed within the frame 1 (described later) via these object lenses 4, 5. This photo-detector is caused to be of the structure including plural photo-detector elements. From an output signal from this photo-detector, a read signal of an information signal from each of the optical discs 101, 102, the focus error signal and the tracking error signal are generated.

Meanwhile, in an optical pick-up including the biaxial actuators 2, 3 and the object lenses 4, 5, in the case where when the frame 1 is caused to undergo movement operation, one object lens is assumed to be moved on a line passing through the center of each of the optical discs 101, 102, the other object lens is moved on a line spaced by a predetermined distance with respect to the center of each of the optical discs 101, 102.

For example, in the case where the first object lens 4 is assumed to undergo movement while maintaining the opposite relationship with respect to a line passing through the center of each of the optical discs 101, 102 and in parallel to the movement direction of the frame 1, the second object lens 5 is caused to undergo movement operation in parallel to the first object lens 4 in the state where the relationship opposite to a line spaced by a predetermined distance with respect to the center of each of the optical discs 101, 102 is maintained. In this case, in the second actuator 3, an angle formed by the second tracking direction which is the movement operation direction of the second object lens 5 and the tangential line of the recording track at the position where the second object lens 5 is opposite thereto does not equal to 90°. Namely, in this second actuator 3, the second tracking direction and the normal line of the recording track at the position where the second object lens 5 is opposite thereto form an angle. As stated above, even if the angle formed by the second tracking direction and the normal line of the recording track is caused to be small at the outer circumferential side of each of the optical discs 101, 102, that angle would be large at the inner circumferential side of each of the optical discs 101, 102.

When angles formed by the respective tracking directions of the biaxial actuators 2, 3 allow the object lenses 4, 5 to undergo movement operation, and normal lines of the recording tracks at positions where these object lenses 4, 5 are opposite thereto become great, it becomes impossible to precisely detect the tracking error signal. Moreover, when angles formed by these tracking directions and normal lines of the recording tracks change at inner and outer circumferential portions, the detection accuracy of the tracking error signal at the inner circumferential side of each of the optical discs 101, 102 and the detection accuracy of the tracking error signal at the outer circumferential side thereof may become values different from each other. Thus, control of the biaxial actuator becomes difficult.

Figure 8:
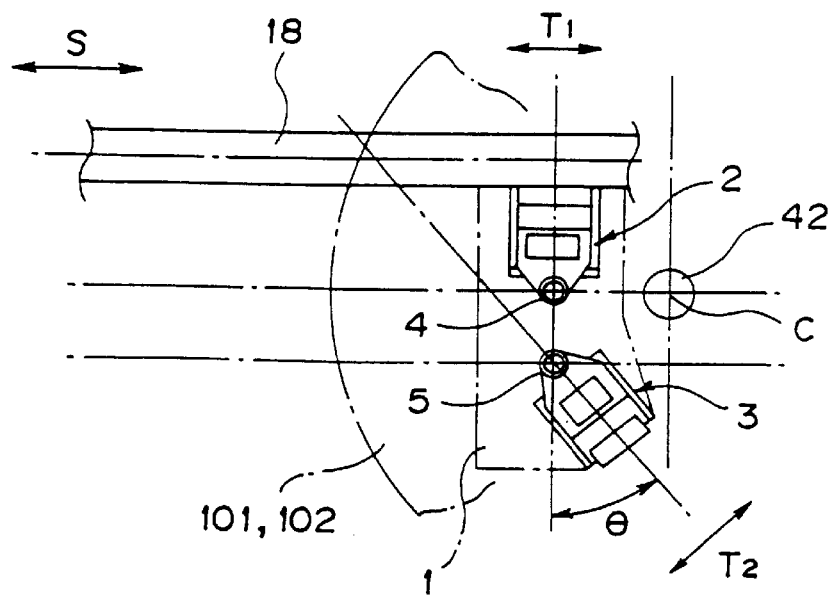
FIG. 8 is a plan view showing arrangement of the biaxial actuator in the optical pick-up.
Figure 9:
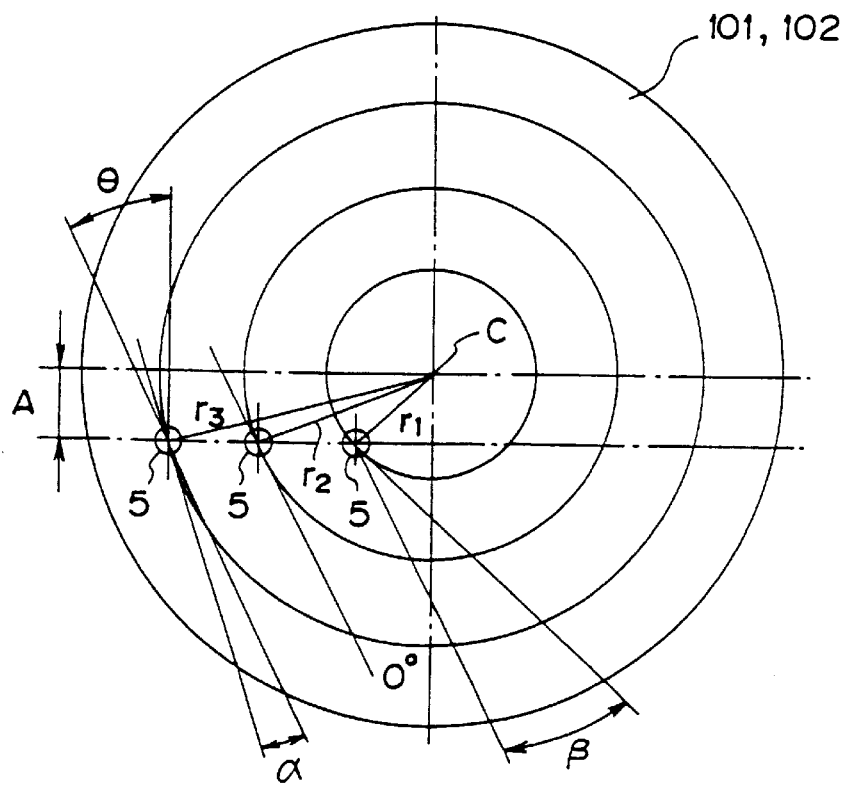
FIG. 9 is a plan view showing the positional relationship between direction of the biaxial actuator and optical disc in the optical pick-up.

In view of the above, on the frame 1, as shown in FIG. 2, the first biaxial actuator 2 is disposed so that the center of the first object lens 4 is positioned on line passing through the center C of the drive shaft 42 of the spindle motor 17 and in parallel to the guide shaft 18, and the first tracking direction T1 is caused to be in parallel to the guide shaft 18. Further, as shown in FIGS. 8 and 9, the second biaxial actuator 3 is disposed so that the center of the first object lens 4 is positioned on line in parallel to the guide shaft 18 in a manner spaced by a predetermined distance A with respect to the center C of the drive shaft 42 of the spindle motor 17, and the second tracking direction T2 takes a predetermined angle with respect to the guide shaft 18. In the optical pick-up shown in FIGS. 1 and 2, the distance A is 8 mm and the angle θ is 14°.

With respect to the second tracking direction T2, the angle with respect to the normal line of the recording track at the position where the second object lens 5 is opposite thereto corresponding to the second tracking direction T2 is caused to be closer to 0° than the angle with respect to the normal line in the axial direction of the guide shaft 18 which is the movement direction of the frame 1 when the second object lens 5 is opposite to the innermost circumferential portion of the signal recording area of the optical disc 102 of the second kind.

Namely, with respect to the second tracking direction T2, as shown in FIG. 9, the angle with respect to the normal line of recording track at the position where the second object lens 5 is opposite thereto is caused to be 0° when the second object lens 5 is opposite to the position (position of distance r2 from the center C in FIG. 9) between the innermost circumferential portion and the outermost circumferential portion of the signal recording area of the optical disc 102.

In the optical disc 101 of the first kind, the innermost circumferential portion (lead-in position) of the signal recording area is the position spaced by 22.6 mm from the center C (r1 in FIG. 9), and the outermost circumferential portion (lead-out position) thereof is the position spaced by 58 mm from the center C (r3 in FIG. 9) (In the case of the so-called "Digital Video Disc (DVD) (trade name)"). Moreover, in the optical disc 102 of the second kind, the innermost circumferential portion (lead-in position) of the signal recording area is the position spaced by 23.5 mm from the center C (r1 in FIG. 9), and the outer circumferential portion (lead-out position) is the position spaced by 58 mm from the center C (r3 in FIG. 9) (In the case of the so-called "Compact Disc (CD)" (trade name).

Moreover, in this disc player, by suitably setting the second tracking direction T2, the angle with respect to the normal line of the recording track at the position where the second object lens 5 is opposite thereto in the second tracking direction T2 when the second object lens 5 is opposite to the innermost circumferential portion of the signal recording area of the second optical disc 102 and the angle with respect to the normal line of the recording track when the second object lens 5 is opposite to the outermost circumferential portion of the signal recording area of the second optical disc 102 can become substantially equal to each other.

Namely, as shown in FIG. 9, when an angle with respect to the normal line of recording track at the position where the second object lens 5 is opposite thereto in the second tracking direction T2 when the second object lens 5 is opposite to the inner circumferential portion of the signal recording area of the second optical disc 102 is assumed to be β, and an angle with respect to the normal line of the recording track at the position where the second object lens 5 is opposite thereto in the second tracking direction T2 when the second object lens 5 is opposite to the outermost circumferential portion of the signal recording area of the second optical disc 102 is assumed to be a, the relationship expressed as α=−β can be caused to hold.

The above-mentioned angle θ which permits the relationship expressed as α=−β to hold as stated above is represented by $(\theta_1+\theta_3)/2$ in the case where an angle with respect to the normal line of the recording track at the position where the second object lens 5 is opposite thereto in the axial direction of the guide shaft 18 when the second object lens 5 is opposite to the innermost circumferential portion of the signal recording area of the second optical disc 102 is designated at $\theta_1$, and an angle with respect to the normal line of the recording track at the position where the second object lens 5 is opposite thereto in the axial direction of the guide shaft 18 when the second object lens 5 is opposite to the outermost circumferential portion of the signal recording area of the second optical disc 102 is designated at $\theta_3$. Further, from the relational expressions described below, $r_1 \sin \theta_1 = A$ $r_3 \sin \theta_3 = A$ $r_0 \sin \theta = r_0 \sin ((\theta_1+\theta_3)/2) = A$ $r_0 = A/\sin ((\theta_1+\theta_3)/2)$ the above-mentioned angle θ is equal to an angle with respect to the normal line of the recording track at the position where the second object lens 5 is opposite thereto in the axial direction of the guide shaft 18 when the second object lens 5 is located at the position of distance $r_0$ obtained from the above relational expressions from the center C of the second optical disc 102. In this case, with respect to the second tracking direction $T_2$, angle with respect to the normal line of the recording track at the position where the second object lens is opposite thereto becomes equal to 0° when the second object lens 5 is opposite to the position of the distance $r_0$ from the center of the optical disc 102 of the second kind.

It is to be noted, with respect to first laser beams passing through the first object lens 4, since detection of the tracking error signal is carried out by the so-called three (3) beam method as described later, this object lens is moved while maintaining the relationship opposite to line passing through the center C of the first optical disc 101 held on the disc table 40 when the frame 1 is caused to undergo movement operation.

Figure 10:
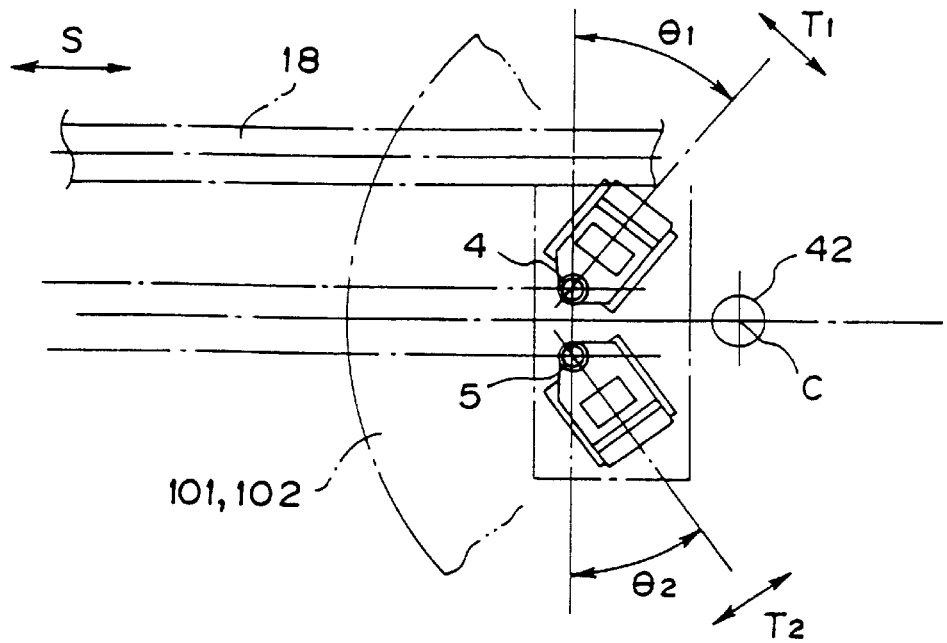
FIG. 10 is a plan view showing another example of arrangement of biaxial actuator in the optical pick-up.
Figure 11:
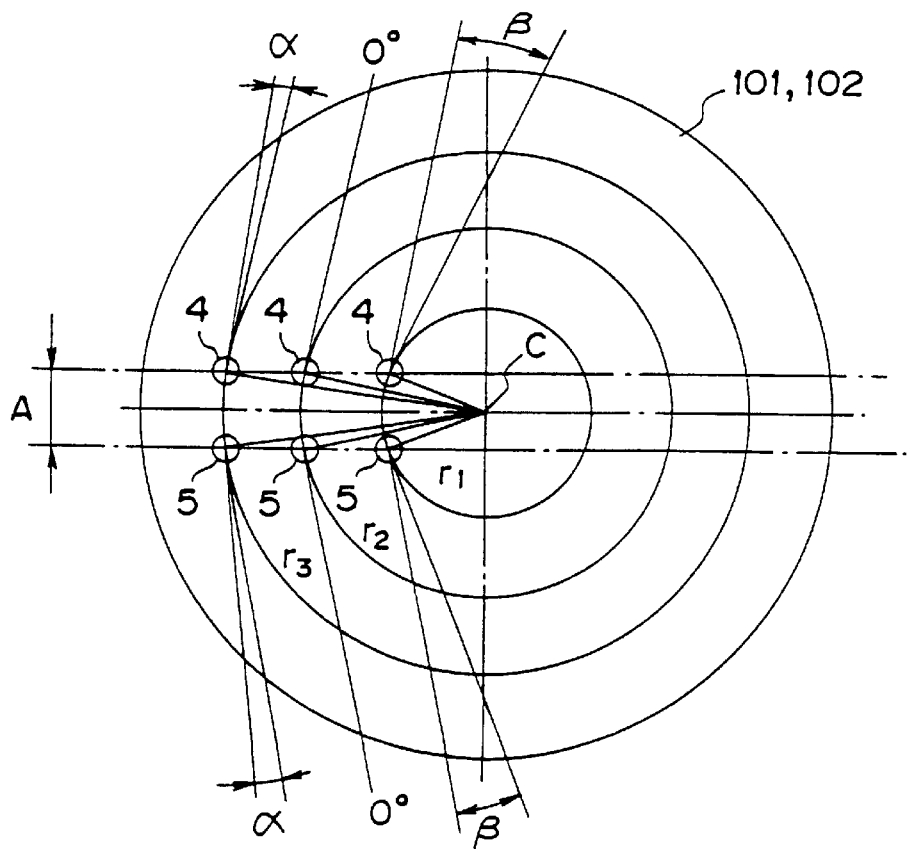
FIG. 11 is a plan view showing the positional relationship between direction of the biaxial actuator and the optical disc in the optical pick-up shown in FIG. 10.

Now, in the case where detection of the tracking error signal is assumed to be carried out by the so-called single (1) beam method with respect to the first laser beams passing through the first object lens 4, both the first and second tracking directions $T_1$, $T_2$ may be set, as shown in FIGS. 10 and 11, so that angles with respect to the normal lines of the recording tracks at the positions where the first and second object lenses 4, 5 are opposite thereto corresponding to these tracking directions T1, T2 are equal to 0° when the respective object lenses 4, 5 are opposite to the position between the innermost circumferential portion and the outermost circumferential portion of the signal recording area of each of the optical discs 101, 102. In this case, the first and second biaxial actuators 2, 3 are respectively disposed in the state inclined by predetermined angles $\theta_1$, $\theta_2$ with respect to the guide shaft 18 as described above with respect to the second actuator 3.

Moreover, in this optical pick-up, in the case where there is a margin with respect to an angle formed by the tracking direction with respect to one object lens and the normal line of the recording track at the position where this object lens is opposite thereto, i.e., in the case where even if the angle formed by the tracking direction and the normal line becomes large, there is no problem in connection with detection of the tracking error signal, and there may be employed a configuration in which the first and second biaxial actuators 2, 3 are disposed without inclining them relative to the guide shaft 18. When the frame 1 is caused to undergo movement operation, one object lens is moved on line passing through the center of each of the optical discs 101, 102 and the other object lens is moved on line spaced by a predetermined distance with respect to the center of each of the optical discs 101, 102.

Figure 13:
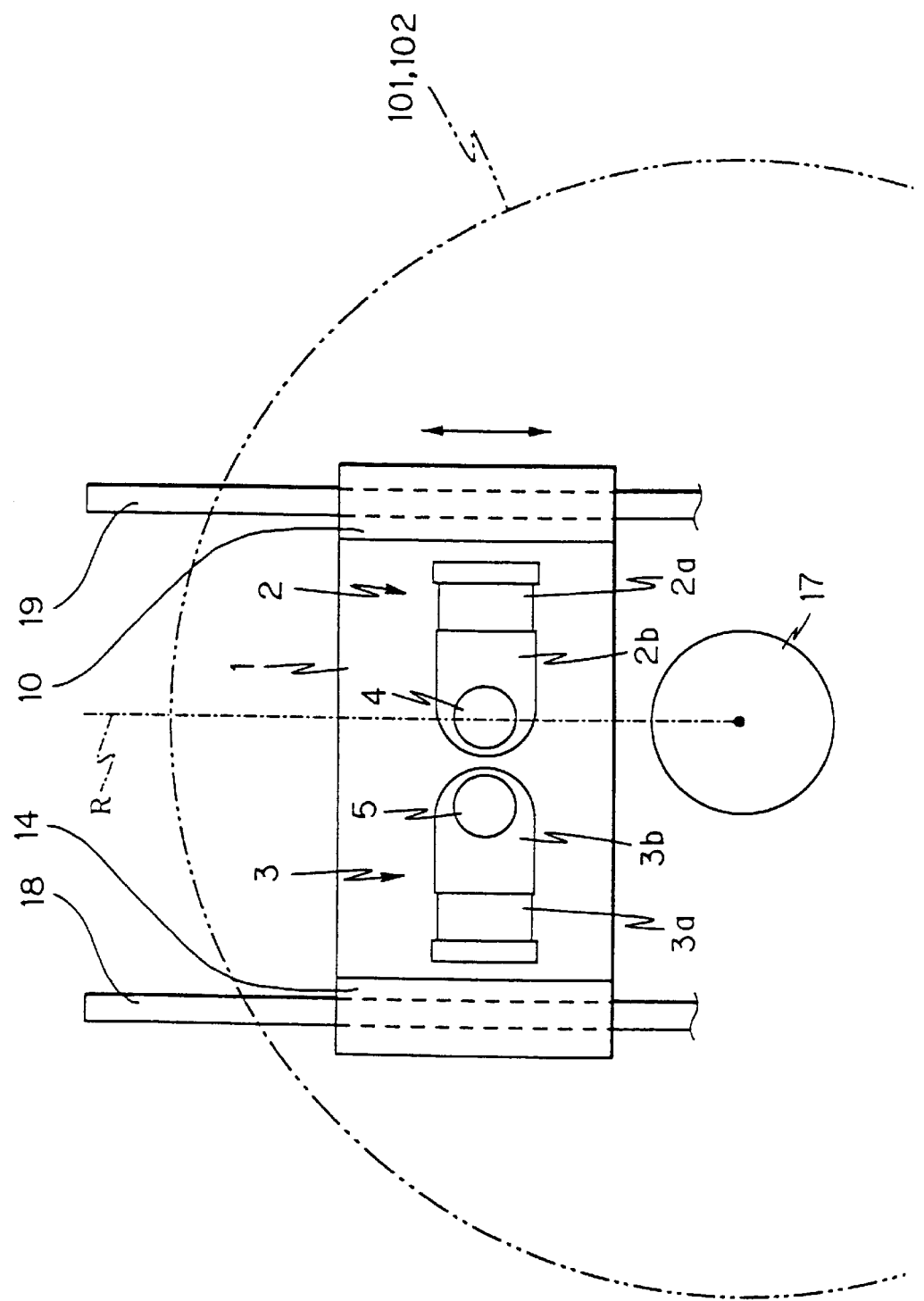
FIG. 13 is a plan view showing the configuration of the optical pick-up shown in FIG. 12.

For example, in the case where there is a margin with respect to an angle formed by the second tracking direction with respect to the second object lens 5 and the normal line of the recording track at the position where the second object lens 5 is opposite thereto, there may be employed an approach as shown in FIG. 13 such that the first object lens 4 is caused to undergo movement while maintaining the opposite relationship with respect to line R passing through the center of each of the optical discs 101, 102 and in parallel to the movement direction of the frame 1, and the second object lens 5 is caused to undergo movement parallel to the first object lens 4 in the state where the relationship opposite to the line spaced by a predetermined distance with respect to the center of each of the optical discs 101, 102 is maintained.

In this case, in the second actuator 3, an angle formed by the second tracking direction which is the movement direction of the second object lens 5 and the tangential line of the recording track at the position where the second object lens 5 is opposite thereto does not become equal to 90°. Namely, in this second actuator 3, the second tracking direction and the normal line of the recording track at the position where the second object lens 5 is opposite thereto form an angle.

Figure 15:
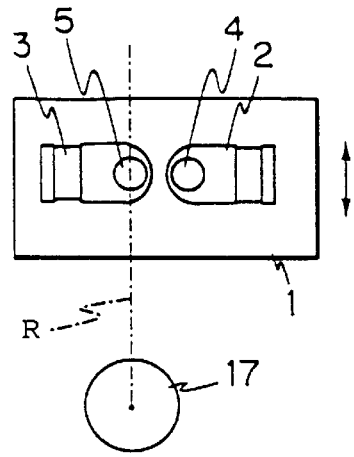
FIG. 15 is a plan view showing the positional relationship between the optical pick-up and the disc-shaped optical recording medium in the above-mentioned disc player, where one object lens located on the radius line of the disc-shaped optical recording medium is shown.

Further, in the case where the first and second biaxial actuators 2, 3 are disposed in the state where they are not inclined relative to the guide shaft 18, when there is a margin with respect to an angle formed by the first tracking direction with respect to the first object lens 4 and the normal line of the recording track at the position where the first object lens is opposite thereto, this optical pick-up may be adapted as shown in FIG. 15 so that the second object lens 5 is caused to undergo movement while maintaining the relationship opposite to line R passing through the center of each of the optical discs 101, 102 and in parallel to movement direction of the frame 1. When the first object lens 4 is caused to undergo movement parallel to the second object lens 5, the relationship opposite to a line spaced by a predetermined distance with respect to the center of each of the optical discs 101, 102 is maintained.

In this case, in the first actuator 2, an angle formed by the first tracking direction which is movement direction of the first object lens 4 and the tangential line of the recording track at the position where the first object lens 4 is opposite thereto does not equal to 90°. Namely, in this first actuator 2, the first tracking direction and the normal line of the recording track at the position where the first object lens 4 is opposite thereto form an angle.

Figure 16:
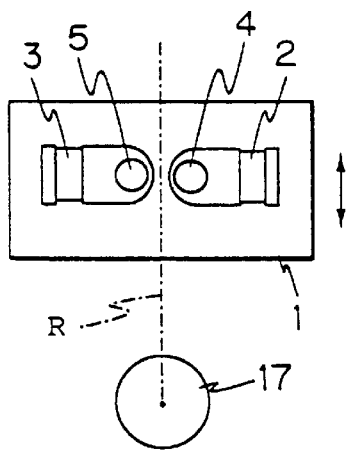
FIG. 16 is a plan view showing the positional relationship between the optical pick-up and the disc-shaped optical recording medium in the above-mentioned disc player, where the radius line of the disc-shaped optical recording medium located between respective object lenses is shown.

Further, in the case where the first and second biaxial actuators 2, 3 are disposed without inclining them with respect to the guide shaft 18, when there are margins, to the same degree, with respect to angle an formed by the first tracking direction and the normal line of the recording track at the position where the first object lens 4 is opposite thereto and an angle formed by the second tracking direction and the normal line of the recording track at the position where the object lens 5 is opposite thereto, this optical pick-up may be constituted as shown in FIG. 16 so that the first and second object lenses 4, 5 are arranged in the circumferential direction of each of the optical discs 101, 102, and line R passing through the center of each of the optical discs 101, 102 and in parallel to the movement direction of the frame 1 is caused to be passed between the respective object lenses 4, 5.

In this case, in the first and second biaxial actuators 2, 3, an angle formed by the first tracking direction and the tangential line of the recording track at the position where the first object lens 4 is opposite thereto and an angle formed by the second tracking direction and the tangential line of the recording track at the position where the second object lens 5 is opposite thereto respectively do not equal to 90°. Namely, in the first and second actuators 2, 3, the first and second tracking directions and the normal lines of the recording tracks at the positions where the first and second object lenses are opposite thereto respectively form angles.

Figure 17:
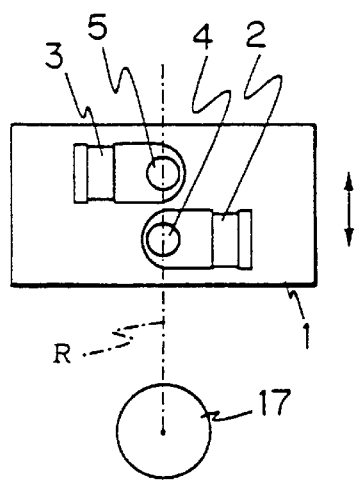
FIG. 17 is a plan view showing the positional relationship between the optical pick-up and the disc-shaped optical recording medium in the above-mentioned disc player, where respective object lenses located on the radius line of the disc-shaped optical recording medium is shown.

Further, in the case where the first and second biaxial actuators 2, 3 are disposed without inclining them with respect to the guide shaft 18, when there are not respectively margins with respect to an angle formed by the first tracking direction and the normal line of recording track at the position where the first object lens 4 is opposite thereto and an angle formed by the second tracking direction and the normal line of recording track at the position where the second object lens 5 is opposite thereto, this optical pick-up may be constituted as shown in FIG. 17 so that the first and second actuators 2, 3 are arranged in the radial direction of each of the optical discs 101, 102, the first and second object lenses 4, 5 are arranged in the radial direction of each of the optical discs 101, 102, and these respective object lenses 4, 5 are caused to undergo movement operation while maintaining the relationship opposite to line passing through the center of each of the optical discs 101, 102 and in parallel to movement direction of the frame 1.

In this case, in the first and second actuators 2, 3, angle formed by the first tracking direction and the tangential line of the recording track at the position where the first object lens 4 is opposite thereto and an angle formed by the second tracking direction and the tangential line of the recording track at the position where the second object lens 5 is opposite thereto respectively become equal to 90°. Namely, in these first and second actuators 2, 3, the first and second tracking directions and normal lines of the recording tracks at the positions where the first and second object lenses 4, 5 are opposite thereto are respectively in correspondence with each other.

[4] Configuration Within the Frame

Figure 4:
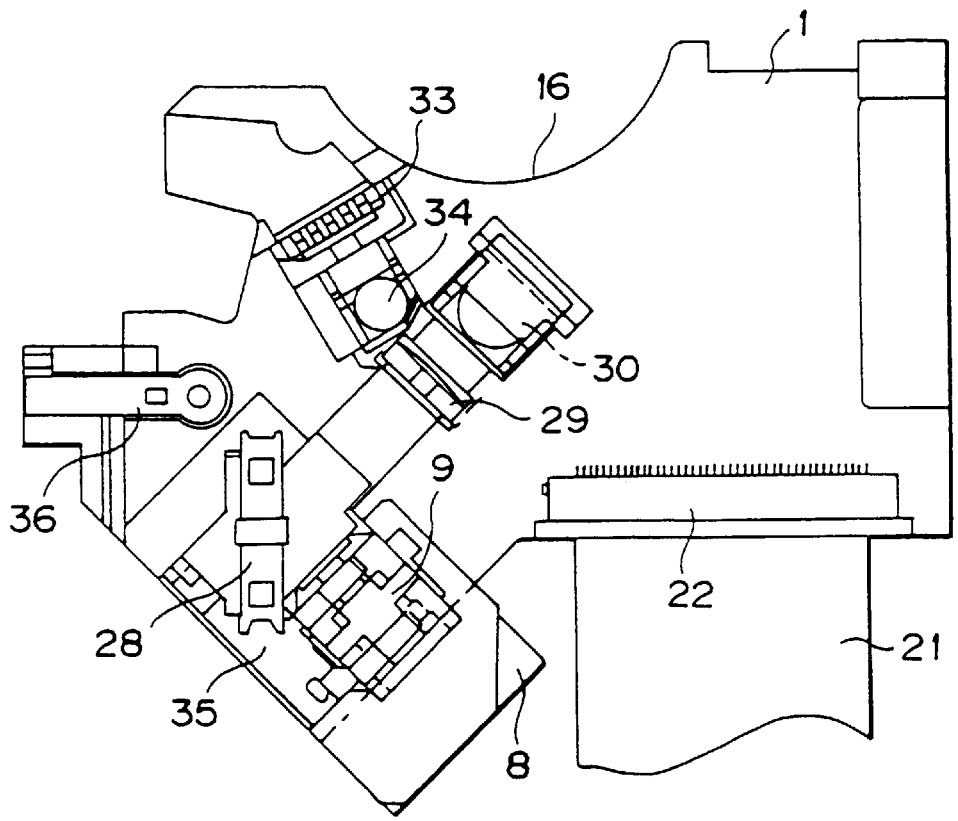
FIG. 4 is a bottom view showing the configuration of the optical pick-up.

Within the frame 1, as shown in FIGS. 4 and 6, a semiconductor laser 38 serving as a first light source and a laser coupler (light emitting/light receiving composite element) 33 including a semiconductor laser chip serving as a second light source are included.

The semiconductor laser 38 and the semiconductor laser chip of the laser coupler 33 respectively emit first and second laser beams which are rays of coherent light of linearly polarized light. These laser beams are divergent light beams. The wavelength of first laser beams that the semiconductor laser 38 emits is 635 nm or 650 nm which is the first wavelength. In addition, the wavelength of the second laser beams that the semiconductor chip of the laser coupler 33 emits is 780 nm which is the second wavelength.

A high frequency (HF) modulate board 37 is connected to the semiconductor laser 38. At the high frequency module board 37, a high frequency circuit drives the semiconductor laser 38 at frequency of about 300 MHZ to 400 MHZ is provided in order to prevent occurrence of return light noise at the semiconductor laser 38. This high frequency module board 37 is accommodated within a shield case 8.

Further, as shown in FIG. 5, the semiconductor laser 38 is disposed within the frame 1 in the state accommodated within a laser holder 9. This laser holder 9 is a cylindrical body formed by metal such as brass, and is adapted so that the semiconductor laser 38 is fitted into the hollow portion.

The portion on the upper surface portion of the frame 1 and corresponding to accommodating position of the laser holder 9 is caused to serve as a radiating portion 10. This radiating portion 10 is adapted so that plural parallel groove portions are formed so that the surface area is increased, and serves to radiate, toward the external heat that the high frequency module board 37 and the semiconductor laser 38 produce.

First laser beams emitted from the semiconductor laser 38 are incident to a beam splitter 28 in a flat plate form via a grating (diffraction grating) 39 attached to the front end portion of the laser holder 9. The grating 39 branches each first laser beam into three laser beams of the 0-th order light and the 1-st order light. The beam splitter 28 is disposed in the state where the principal surface portion is inclined so as to take angle of 45° with respect to the optical axis of the first laser beams. This beam splitter 28 allows a portion of the first laser beams to be transmitted therethrough, and allows the remaining portion to be reflected. The first laser beams reflected by the beam splitter 28 are incident to a collimator lens 29, and are caused to be first parallel laser beams by the collimator lens 29.

The first parallel laser beams which have been passed through the collimator lens 29 are emitted toward the external side of the frame 1 through a first through-hole 6 provided at the upper surface portion of the frame 1. Further, the first parallel laser beams are incident to the first object lens 4. This first object lens 4 converges the first parallel laser beams onto the signal recording layer of the optical disc 101 of the first kind.

The laser coupler 33 is caused to be of the structure in which the semiconductor laser chip and first and second photo-detectors are disposed on the same semiconductor base portion. The semiconductor laser chip is disposed on the semiconductor base portion through a heat sink. The photo-detectors are respectively formed on the semiconductor base portion in the state divided into plural light receiving surfaces.

Further, in this laser coupler 33, beam splitter prisms are disposed in the state positioned on the respective photo-detectors. This beam splitter prism is adapted so that the beam splitter surface serving as a slanting surface portion having a predetermined inclination angle with respect to the upper surface portion of the semiconductor base portion is directed to the semiconductor laser chip side.

In this laser coupler 33, the semiconductor laser chip emits the second laser beams toward the beam splitter surface. The second laser beams which have been emitted from the semiconductor laser chip are reflected by the beam splitter surface, and are emitted upwardly in a direction perpendicular to the semiconductor base portion.

The second laser beams which have been emitted from the laser coupler 33 are reflected by a raising mirror 34, and are emitted toward the external side of the frame 1 through a second through-hole 7 provided at the upper surface portion of the frame 1. Further, the second parallel laser beams are incident to the second object lens 5. The second laser beams which have been incident to the second object lens 5 are converged onto the surface portion of the signal recording layer of the optical disc 102 of the second kind after being transmitted through the transparent base of the optical disc 102 of the second kind.

Further, a skew sensor 12 is attached on the upper surface portion of the frame 1. This skew sensor 12 includes light emitting elements like LEDs and plural light receiving elements like photo-diodes. This skew sensor 12 is constituted to irradiate light that the light emitting element emits onto the optical disc 101 or 102 loaded on the disc table 40 to detect position of reflected light (intensity distribution) by each of the optical discs 101, 102 of this light by the light receiving element to have ability of detecting inclination (skew) of the optical disc 101 or 102. Further, there is provided a tilting mechanism to allow inclination of the frame 1 to follow inclination of the optical disc 101 or 102 on the basis of output of the skew sensor 12, thereby making it possible to more precisely carry out write and read operations of information signals with respect to these optical discs 101, 102.

Figure 12:
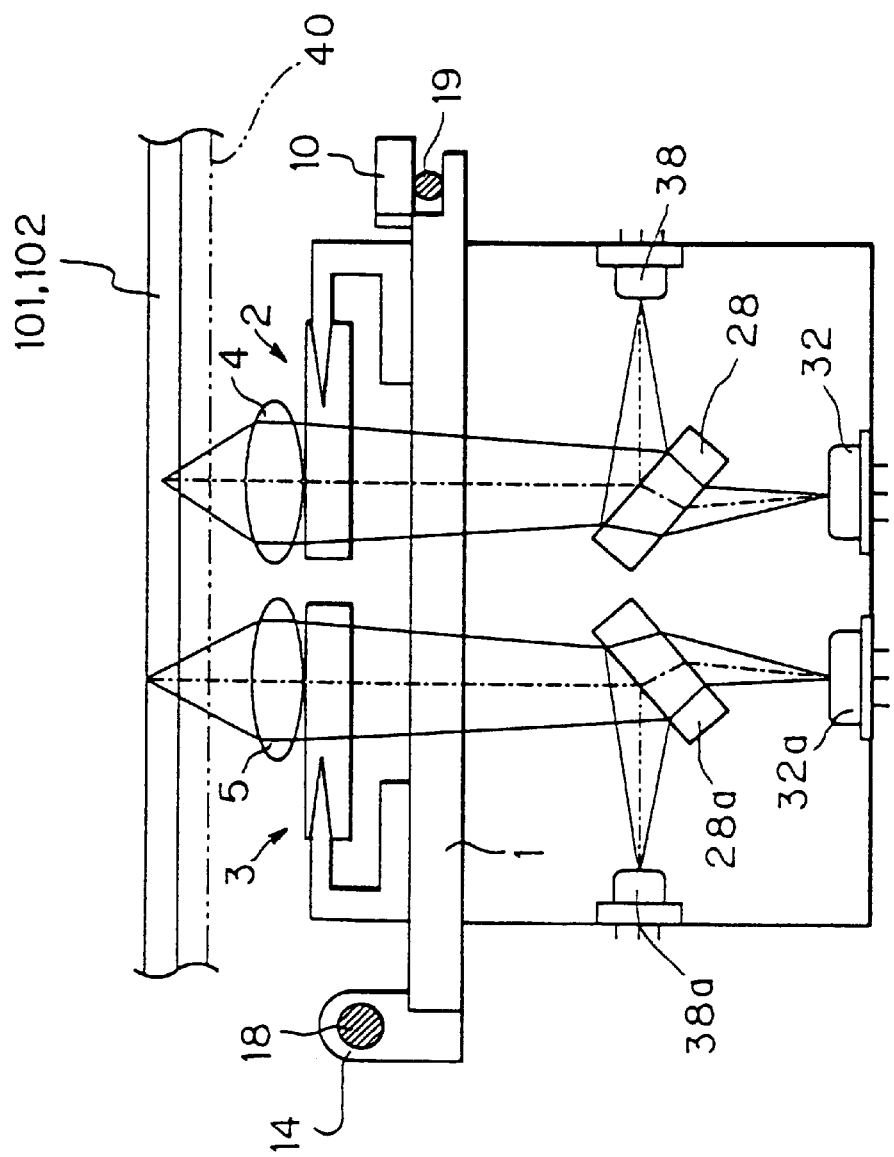
FIG. 12 is a side view showing outline of the configuration of the inside of the optical pick-up with a portion thereof being broken.

Further, within the frame 1, as shown in FIG. 12, a first semiconductor laser 38 serving as a first light source and a second semiconductor laser 38a serving as a second light source may be included. These semiconductor laser devices 38, 38a respectively emit first and second laser beams which are rays of coherent light of linearly polarized light. These laser beams are divergent light beams. The wavelength of first leaser beams that the first semiconductor laser 38 emits is 635 nm or 650 nm which is the first wavelength. In addition, the wavelength of second laser beams that the second semiconductor 38a emits is 780 nm which is the second wavelength.

The first laser beams which have been emitted from the first semiconductor laser 38 are incident to a beam splitter 28 in a flat plate form via a grating (not shown). The grating branches each first laser beam into three laser beams of the 0-th order light and the 1-st order light. The beam splitter 28 is disposed in the state where the principal surface portion thereof so as to take an angle of 45° with respect to the optical axis of the first laser beams. This beam splitter 28 allows a portion of the first laser beams to be transmitted therethrough, but allows the remaining portion to be reflected. The first laser beams reflected by the beam splitter 28 are emitted toward the external side of the frame 1 through through-hole provided at the upper surface portion of the frame 1. Further, the first laser beams are incident to the first object lens 4 supported by the first biaxial actuator 2. This first object lens 4 converges the first laser beams onto the signal recording layer of the optical disc 101 of the first kind.

Further, the first laser beams reflected on the surface of the signal recording layer of the optical disc 101 of the first kind are received by the first photo-detector 32 after being transmitted through the first object lens 4 and the beam splitter 28.

Further, the second laser beams emitted from the second semiconductor laser 38*a* are incident to a beam splitter 28*a* in a flat plate form. This beam splitter 28*a* is disposed in the state where the principal surface portion thereof so as to take angle of 45° with respect to the optical axis of the second laser beams. This beam splitter 28*a* allows a portion of the second laser beams to be transmitted therethrough, and allows the remaining portion to be reflected. The second laser beams reflected by the beam splitter 28*a* are emitted toward the external side of the frame 1 through through-hole provided at the upper surface portion of the frame 1. Further, the second laser beams are incident to the second object lens 5 supported by the second biaxial actuator 3. This second object lens 5 converges the second laser beams onto the signal recording layer of the optical disc 102 of the second kind.

Further, the second laser beams reflected on the surface of the signal recording layer of the optical disc 102 of the second kind are received by a second photo-detector 32*a* after transmitted through the second object lens 5 and the beam splitter 28*a*.

Figure 18:
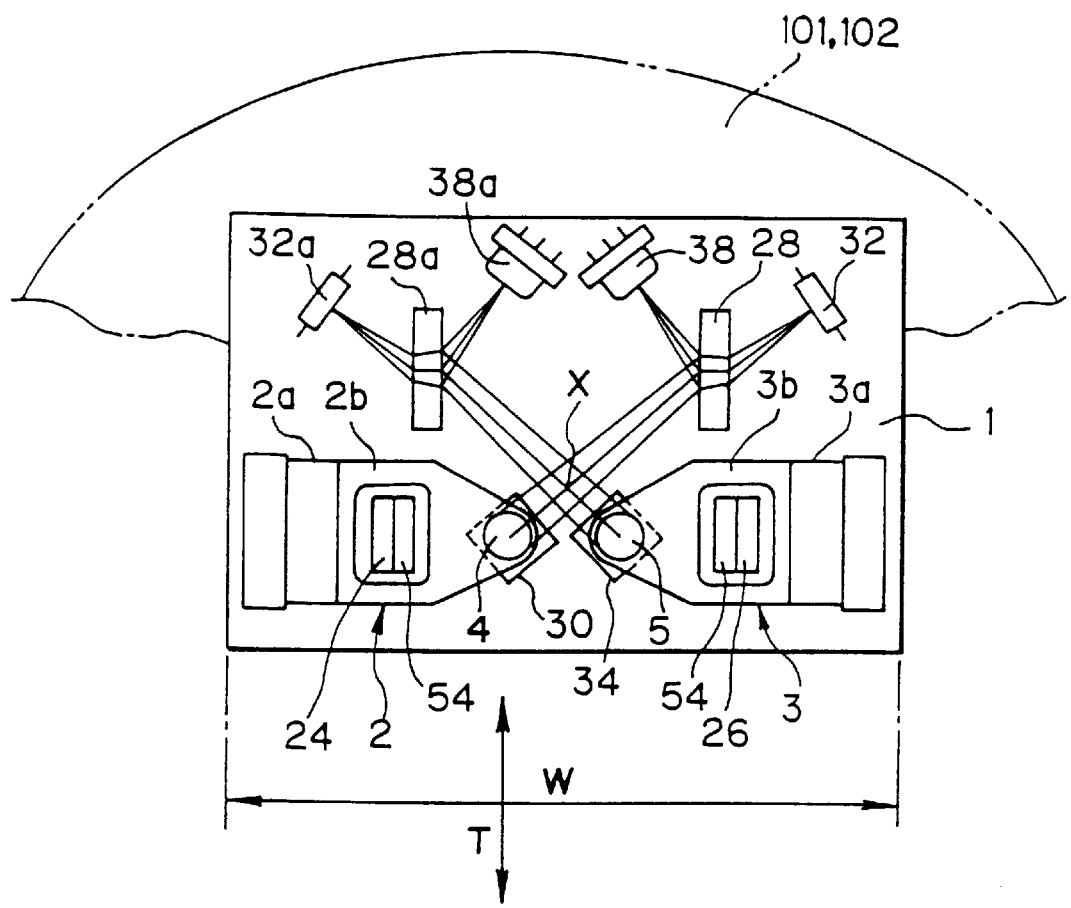
FIG. 18 is a plan view showing another example of the configuration of the optical pick-up.
Figure 19:
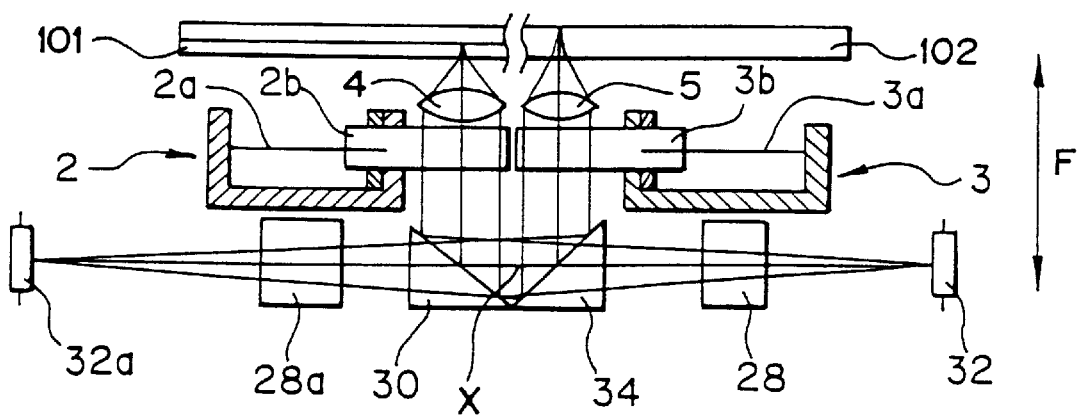
FIG. 19 is a longitudinal cross sectional view showing the configuration of the optical pick-up shown in FIG. 18.

Further, this optical pick-up may be constituted as shown in FIG. 18 so that, within the frame 1, the first optical path ranging from the first semiconductor laser 38 to the first object lens 4 and the second optical path ranging from the second semiconductor laser 38*a* to the second object lens 5 cross with each other at the crossing point X. This crossing point X is positioned between the beam splitter 28 and the first reflection mirror 30 on the first optical path. As shown in FIG. 19, the first reflection mirror 30 serves to deflect the first laser beams to allow them to be incident to the first object lens 4. Moreover, this crossing point X is positioned between the beam splitter 28*a* and the second reflection mirror 34 on the second optical path. As shown in FIG. 19, the second reflection mirror 34 serves to deflect second laser beams to allow them to be incident to the second object lens 5.

In this optical pick-up, since the respective optical paths are crossed with each other, sum total of volume that these optical paths occupy is reduced to such a degree that the respective optical paths overlap with each other. For this reason, in this optical pick-up, sizes (dimensions) in the arrangement direction of the respective object lenses 4, 5 of the frame 1 indicated by arrow W in FIG. 18 can be reduced.

Figure 20:
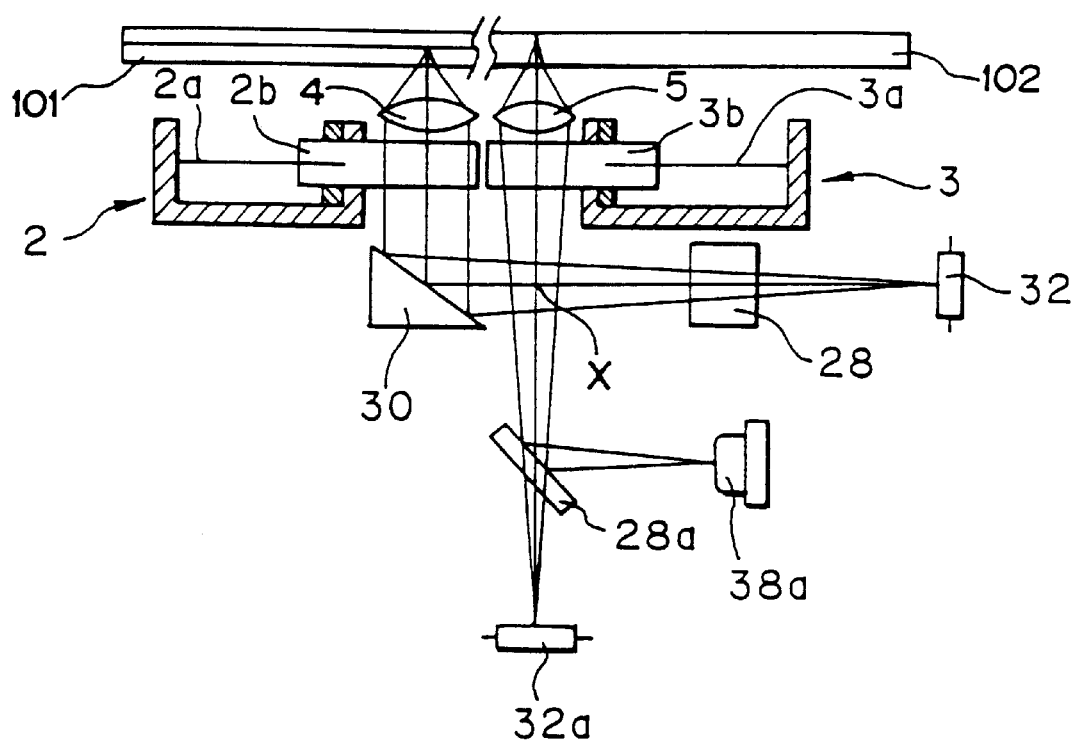
FIG. 20 is a plan view showing outline of a further example of the configuration of the optical pick-up.
Figure 21:
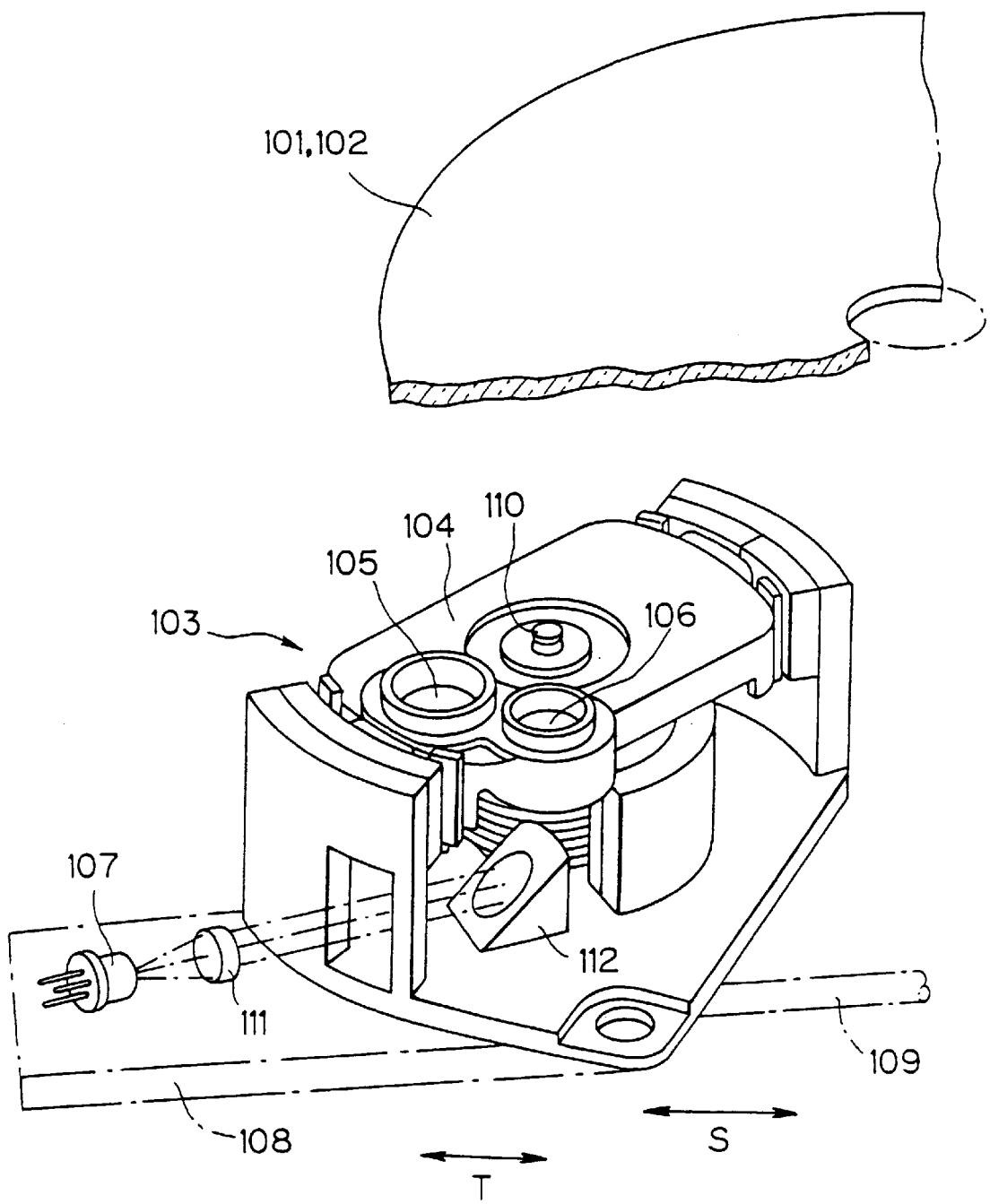
FIG. 21 is a perspective view showing the configuration of a conventional optical pick-up.

Further, with respect to the optical path configuration for first and second light beams within the frame 1, there may be employed, as shown in FIG. 20, a configuration in which the reflection mirror is not provided on one optical path of these optical paths. Namely, first laser beams emitted from the first semiconductor laser are incident to the beam splitter in flat plate form. This beam splitter 28 is disposed in the state where the principal surface portion is inclined so as to take an angle of 45° relative to the optical axis of the first laser beams. This beam splitter 28 allows a portion of the first laser beams to be transmitted therethrough and allows the remaining portion to be reflected. The first laser beams reflected by the beam splitter 28 are reflected by the reflection mirror 30 and are emitted toward the external side of the frame 1 through through-hole provided at the upper portion of the frame 1. Further, the first laser beams are incident to the first object lens 4. This first object lens 4 converges the first laser beams onto the signal recording layer of the optical disc 101 of the first kind.

Further, within the frame 1, second laser beams emitted from the second semiconductor laser 38*a* are incident to the beam splitter 28*a* in parallel plate form. This beam splitter 28*a* is disposed in the state where the principal surface portion is inclined so as to take an angle of 45° with respect to the optical axis of the second laser beam. This beam splitter 28*a* allows a portion of the second laser beams to be transmitted therethrough and allows the remaining portion to be reflected. The second laser beam reflected by the beam splitter 28*a* are emitted toward the external side of the frame 1 through though-hole provided at the upper surface portion of the frame 1. Further, the second laser beams are incident to the second object lens 5. This second object lens 5 converges the second laser beams onto the signal recording layer of the optical disc 102.

In this case, the first optical path ranging from the first semiconductor laser 38 to the first object lens 4 and the second optical path ranging from the second semiconductor laser 38*a* to the second object lens 5 are adapted so that their optical axes are crossed with each at the crossing point X. This crossing point X is positioned between the beam splitter 28 and the reflection mirror 30 on the first optical path. In addition, this crossing point X is positioned between the beam splitter 28*a* and the second object lens 5 on the second optical path.

Also in this optical pick-up, since the respective optical paths are crossed with each other, the sum total of volume that these optical paths occupy is reduced to a degree such that the respective optical paths overlap with each other. For this reason, also in this optical pick-up, size (dimensions) of the frame 1 can be reduced.

[5] Configuration of the Disc Player

Figure 14:
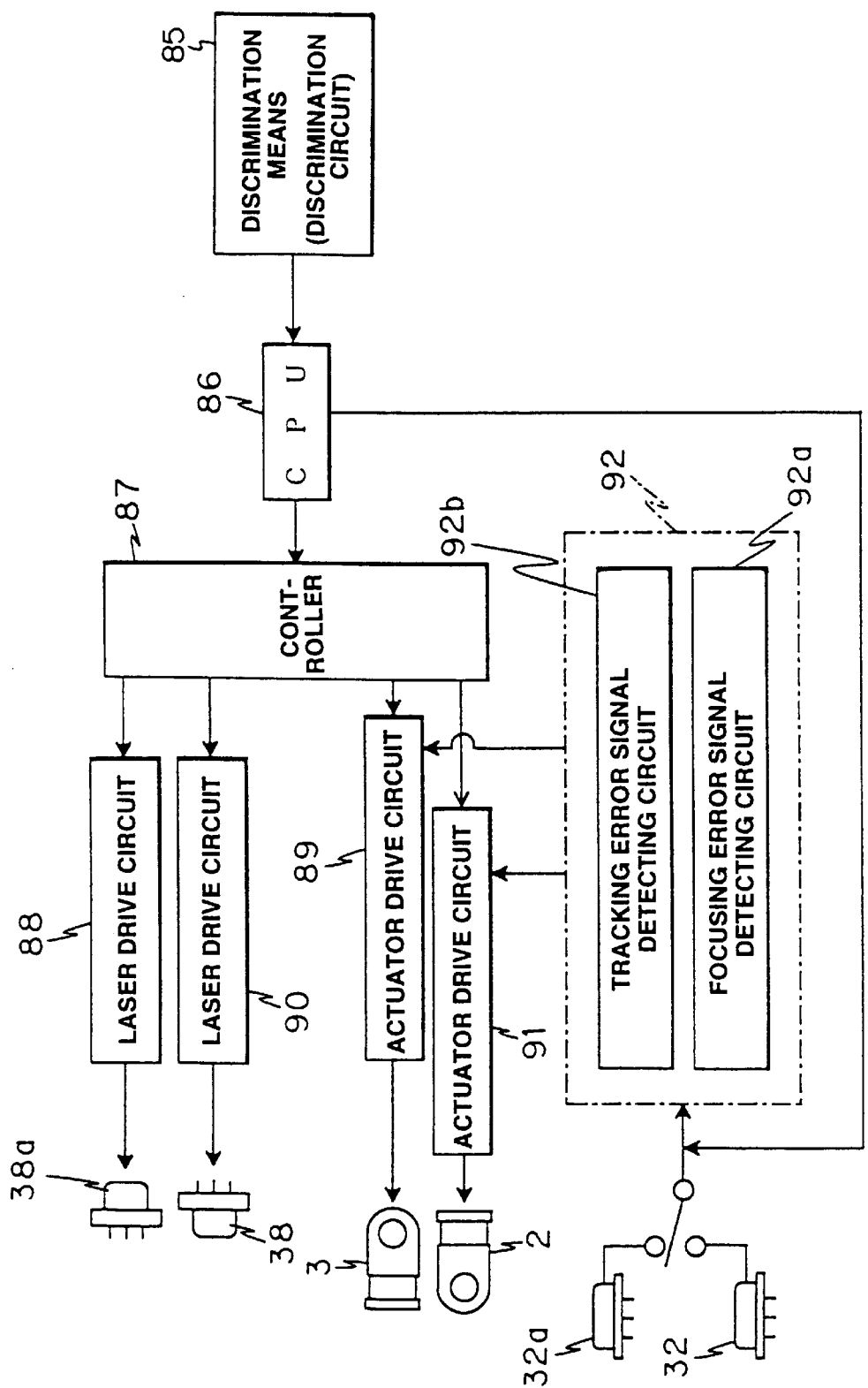
FIG. 14 is a block diagram showing the configuration of a disc player according to this invention.

The disc player according to this invention includes, as shown in FIG. 14, discrimination means (discrimination circuit) 85 for discriminating the kind of the disc-shaped optical recording medium loaded on the disc table 40, a CPU (Central Processing Unit) 86 which is a control circuit, and a controller 87 for carrying out various controls in dependency upon signals sent out from the CPU 86.

In the case where the optical disc 101 is loaded on the disc table 40, it is discriminated by the discrimination means 85 in accordance with read result of the discrimination label, which is so called ID, of the optical disc 101 that the loaded disc-shaped optical recording medium is the optical disc 101. As a result, a discrimination signal thus obtained is sent to the controller 87 via the CPU 86.

The controller 87 respectively sends drive signals to a laser drive circuit 90 and an actuator drive circuit 91 on the basis of the discrimination signal sent thereto to drive the first semiconductor laser 38 and the first biaxial actuator 2. As a result, the first laser beams are emitted from the first semiconductor laser 38. Thus, a read operation of information signal from the first optical disc 101 is carried out through the first photo-detector 32.

On the other hand, in the case where the second optical disc 102 is loaded on the disc table 40, it is discriminated by the discrimination means 85 in accordance with a read result of the discrimination label, which is so called ID, of the second optical disc 102 that the loaded disc-shaped optical recording medium is the second optical disc 102. As a result, a discrimination signal thus obtained is sent to the controller 87 through the CPU 86.

The controller 87 respectively sends drive signals to a laser drive circuit 88 and an actuator drive circuit 89 on the basis of the discrimination signal sent thereto to drive a second semiconductor laser 38a and the second biaxial actuator 3. As a result, second laser beams are emitted from the second semiconductor laser 38a. Thus, a read operation of information signal from the second optical disc 102 is carried out through the second photo-detector 32a. Moreover, also in the case where any one of the optical discs 101, 102 is loaded on the disc table 40, output signals from the photo-detectors 32, 32a are sent to a focusing error signal detecting circuit 92a and a tracking error signal detecting circuit 92b. Output signals from these photo-detectors 32, 32a include focus error signal and tracking error signal in addition to read signal. The respective error signal detecting circuits 92a, 92b detect the focus error signal and the tracking error signal from the signals sent thereto. The focus error signal and the tracking error signal are sent from the error signal detecting circuit 92 to the respective actuator drive circuits 89, 91. The respective biaxial actuators 2, 3 are driven on the basis of the focus error signal and the tracking error signal.

Further, in the disc player, a detection output obtained by the skew sensor 12 is sent to the CPU 86. Furthermore, a signal outputted from the optical pick-up is sent to the CPU 86.

In this way, the CPU 86 controls, in accordance with various signals sent thereto, the pick-up, the spindle motor 17 and the sled motor. Namely, the CPU 86 controls drive of the respective biaxial actuators 2, 3 and light emitting/quenching of the semiconductor laser devices 38, 38a or the semiconductor laser chip. In addition, the CPU 86 controls rotational drive of the spindle motor 17 and the sled motor.

Further, the CPU 86 is operative so that in the case where it is judged that the optical disc loaded on the disc table 40 is the optical disc 101 of the first kind, it allows the first semiconductor laser 38 to emit light, and allows the second semiconductor laser 38a or the semiconductor laser chip to be quenched. At this time, the first laser beams which have been passed through the first object lens 4 are irradiated onto the optical disc 101 of the first kind from the transparent base side of the optical disc 101 of the first kind, and are converged onto the signal recording layer after transmitted through the transparent base. The first object lens 4 is caused to undergo movement operation in the optical axis of the first object lens 4 and in the direction perpendicular to the optical axis by the first biaxial actuator 2. This first object lens 4 is caused to undergo movement operation in a manner to follow displacement in the optical axis direction (so called plane vibration) of the first object lens 4 of the optical disc 101 of the first kind by the first biaxial actuator 19 to thereby allow the focal point of the laser beams to be positioned on the signal recording layer at all times. Further, this object lens 4 is caused to undergo movement operation in a manner to follow displacement in the direction perpendicular to the optical axis of the first object lens 4 of recording track of the optical disc 101 of the first kind by the first biaxial actuator 2 to thereby allow the focal point of the first laser beams to be positioned on the recording track at all times.

This optical pick-up irradiates, in the converged state, the first laser beams onto the signal recording layer of the optical disc 101 of the first kind to thereby carry out write and read operations of information signals with respect to this signal recording layer. In the write operation of information signals, in the case where the optical disc 101 of the first kind is a magneto-optical disc, the first laser beams are irradiated onto the magneto-optical disc, and external magnetic field is applied to irradiation position of the first laser beams. By modulating either light output of the first laser beams or strength of the external magnetic field in dependency upon an information signal to be recorded, a write operation of an information signal with respect to the magneto-optical disc is carried out. In addition, in the case where the optical disc 101 of the first kind is a phase change type disc, light output of the first laser beams is modulated in dependency upon an information signal to be recorded, whereby a write operation of the information signal with respect to the phase change type disc is carried out.

Further, in this optical pick-up, the first laser beams are irradiated in the converged state onto the signal recording layer of the optical disc 101 of the first kind to detect reflected light beams by the signal recording layer of the laser beams, whereby a read (read-out) operation of information signal from the signal recording layer is carried out.

In the read operation of information signals, in the case where the optical disc 101 of the first kind is a magneto-optical disc, change in the polarization direction of the reflected light beams is detected, whereby a read operation of information signals from the magneto-optical disc is carried out. Further, in the case where the optical disc 101 of the first kind is the phase change type disc, or the so-called pit disc, a change of quantity of reflected light of the reflected light beams is detected, whereby read operation of information signals is carried out.

Namely, the first laser beams converged on the signal recording layer are reflected by the signal recording layer, and return to the first object lens 4 as reflected light beams. The reflected light beams which have returned to the first object lens 4 are caused to be parallel light beams by the first object lens 4, and return to the beam splitter 28 via the collimator lens 29. The reflected light beams which have returned to the beam splitter 28 are transmitted through the beam splitter 28, and are branched with respect to the optical path returning to the semiconductor laser 1. The light beams thus branched are traveled toward the photo-detector (OEIC) 32.

Since the beam splitter 28 is a parallel plane plate inclined with an angle of 45° with respect to the optical axis of the reflected light beams, astigmatism is caused to take place in the reflected light beams. Moreover, in the case where the optical disc 101 of the first kind is a magneto-optical disc, the reflected light beams which have been passed through the beam splitter 28 are incident to the photo-detector (OEIC) 32 via a Wollaston prism. The Wollaston prism branches each reflected light beam into three light beams of first polarization component which is polarized light in a polarization direction of the reflected light beam, a second polarization component which is polarized light in a direction of +45° with respect to polarization direction of the reflected light beam, and a third polarization component which is polarized light in a direction of −45° with respect to the polarization direction of the reflected light beam.

The photo-detector (OEIC) 32 includes plural photo-diodes corresponding to plural light beams branched by the grating 39 and the Wollaston prism, and adapted to receive the respective light beams by photo-diodes respectively corresponding thereto. Light detection outputs from the respective photo-diodes of the photo-detector OOEIC) 32 are caused to undergo arithmetic processing, whereby a read signal of information signal recorded on the magneto-optical disc, a focus error signal and a tracking error signal are generated. The focus error signal is a signal indicating quantity and direction of positional deviation in the optical axis direction of the first object lens 4 between focal point of the first laser beam by the first object lens 4 and the surface portion of the signal recording layer of the optical disc 101 of the first kind. The tracking error signal is a signal indicating quantity and direction of positional deviation in a direction perpendicular to the optical axis of the first object lens 4 between the focal point of the first laser beam by the first object lens 4 and the recording track of the optical disc 101 of the first kind. The first biaxial actuator 2 is driven on the basis of the focus error signal and the tracking error signal.

In the photo-detector 5 (OEIC) 32, the photo-diode which receives reflected light beam from the signal recording layer of the 0-th order light of the first laser beam includes four light receiving surface portions radially arranged with the optical axis of the reflected light beam being as center. Further, a beam spot that the reflected light beam forms on the light receiving surfaces of the four photo-diodes is caused to be an elliptical beam spot in which the long diameter direction is caused to be in a direction corresponding to the direction of astigmatism produced by the beam splitter 28. Assuming now that light detection outputs from the four light receiving portions are respectively designated at a, b, c, d, $$Fe=(a+c)-(b+d)$$

is a signal indicating direction and quantity of astigmatism of the reflected light beam. This Fe is a focus error signal indicating distance between the focal point of the first laser beam by the first object lens 4 and the signal recording surface of the optical disc 101 of the first kind and direction thereof.

The biaxial actuator 2 is driven on the basis of the focus error signal Fe to allow the first object lens 4 to undergo movement operation to thereby execute focus servo operation for allowing the focal point of the first laser beam by the first object lens 4 to be positioned on the signal recording surface at all times.

Further, in the photo-detector (OEIC) 32, the photo-diodes which receive reflected light beams from the signal recording layer of 1-st order light of the first laser beam are caused to be of the structure including two light receiving portions independent each other. In addition, when the focal point by the first object lens 4 of the 0-th order light of the first laser beam is positioned on the recording track, light quantities of reflected light beams of the 1-st order light are equal to each other. Assuming now that light detection outputs from the two light receiving surface portions are respectively designated at e and f, $$Te=e-f$$

is a signal indicating difference between light quantities of reflected light beams of the 1-st order light. This Te is a tracking error signal, and is a signal indicating distance between the focal point of the 0-th order light of the first laser beam by the first object lens 4 and the recording track of the optical disc 101 of the first kind and direction thereof.

The first biaxial actuator 2 is driven on the basis of the tracking error signal Te to allow the first object lens 4 to undergo movement operation to thereby execute the tracking servo operation, for allowing the focal point of the 0-th order light of the first laser beam by the first object lens 4 to be positioned on the recording track at all times.

Further, this optical pick-up is caused to undergo movement operation along the guide shaft 18 and the support shaft 19, whereby the first object lens 4 is caused to undergo movement operation so that the first object lens 4 is opposed with respect to the entire range of the signal recording area of the optical disc 101 of the first kind. Thus, write and read operations of information signals can be carried out with respect to the entire range of the signal recording area. Namely, this optical pick-up is caused to undergo movement operation along inner and outer circumferential directions of the optical disc 101 of the first kind, and the optical disc 101 of the first kind is caused to undergo rotational operation, thereby making it possible to carry out write and read operations of information signals with respect to the entire range of the signal recording area of the optical disc 101 of the first kind.

Meanwhile, in this optical pick-up, detection of the tracking error signal with respect to the optical disc 101 of the first kind is carried out by the so-called three (3) beam method as described above. Accordingly, in this optical pick-up, as shown in FIG. 2, the first object lens 4 is caused to undergo movement operation along the inner and outer circumferential directions of the optical disc 101 of the first kind while maintaining the state opposite to line passing through the center of the disc optical disc 101 of the first kind (i.e., the center of the disc table 40) (viz., in the state where its optical axis is crossed with line passing through the center of the optical disc 101 of the first kind).

It is to be noted that with respect to the first laser beams, a tracking error signal may be detected by the so-called single (1) beam method. In this case, the grating 39 is not provided. Further, detection of the tracking error signal can be carried out by employment of the so-called push-pull method, the phase difference method (the so-called V-DPD system is also included), or the wobbling method, etc. In this case, as described above, when the frame 1 is caused to undergo movement operation, the first object lens 4 is not required to maintain the state opposite to linear line passing through the optical disc 101 of the first kind.

Further, the CPU 86 is operative so that in the case where it is judged that the optical disc loaded on the disc table 40 is the optical disc 102 of the second kind, it allows the semiconductor laser chip or the second semiconductor laser 38a to emit light and allows the semiconductor laser 38 to be quenched. At this time, the second laser beams which have been passed through the second object lens 5 are irradiated onto the optical disc 102 of the second kind from the transparent base side of the optical disc 102 of the second kind, and are converged onto the signal recording layer 102b after transmitted through the transparent base. The second object lens 5 is caused to undergo movement operation in the optical axis direction of the second object lens 5 and in the direction perpendicular to the optical axis by the second biaxial actuator 3. This second object lens 5 is caused to undergo movement operation by the second biaxial actuator 3 in a manner to follow displacement in the optical axis direction (so called plane vibration) of the second object lens 5 of the optical disc 102 of the second kind to thereby allow the focal point of the second laser beams to be positioned on the signal recording layer at all times. In addition, this second object lens 5 is caused to undergo movement operation by the second biaxial actuator 3 in a manner to follow displacement in the direction perpendicular to the optical axis of the second object lens 5 of recording track of the optical disc 102 of the second kind to thereby allow the focal point of the second laser beams to be positioned on the recording track at all times.

This optical pick-up irradiates, in the converged state, the second laser beams onto the signal recording layer 102b of the optical disc 102 of the second kind to thereby carry out read operation of information signals from the signal recording layer. Namely, in this optical pick-up, the second laser light beams are irradiated, in the converged state, onto the signal recording layer of the optical disc 102 of the second kind to detect reflected light beams by the signal recording layer of the second laser beams, whereby read operation of information signals from the signal recording layer is carried out. Such a read operation of information signals is carried out by detecting changes of quantity of reflected light of the reflected light beams.

Namely, the second laser light beam converged onto the surface portion of the signal recording layer is reflected by the signal recording layer and returns to the second object lens 5. The reflected light beams which has returned to the second object lens 5 returns to the beam splitter surface within the laser coupler 33 via the raising mirror 34.

The reflected light beam which has returned to the beam splitter surface is transmitted through the beam splitter surface and is then incident into the beam splitter prism 43, whereby this reflected light beam is branched from the optical path returning to the semiconductor laser chip. The branched light beams are received by the first photo-detector. In addition, this reflected light beam is reflected by the surface portion of the first photo-detector and the internal surface portion of the beam splitter prism, and is received also by the second photo-detector.

On the basis of light detection outputs outputted from the respective photo-detectors, a read signal (RF signal) of information signal recorded on the optical disc 102 of the second kind, a focus error signal Fe indicating deviation in the optical axis direction (focus error) between the focal point of the second laser beams by the second object lens 5 and the surface portion of the signal recording layer, and a tracking error signal Te indicating deviation in the direction perpendicular to the optical axis and the recording track (tracking error) between the focal point and the recording track formed at the surface portion of the signal recording layer are calculated.

Namely, the read-out signal (RF signal) is obtained by sum of respective light detection outputs of the hoto-detectors. Moreover, the focus error signal Fe is obtained as difference between respective light detection outputs of the photo-detectors.

Further, the tracking error signal Te is obtained as difference ((A+D)−(B+C)) between sum of light detection output (A) from the light receiving surface of the side of one side of the first photo-detector and light detection output (D) from the light receiving surface of the side of the other side of the second photo-detector and sum of light detection output (B) from the light receiving surface of the side of the other side of the first photo-detector and light detection output (C) from the light receiving surface of the side of one side of the second photo-detector.

In this example, in the above-mentioned respective photo-detectors 45, 46, the divisional line between the light receiving surface of the side of one side and the light receiving surface of the side of the other side is adapted so as to take angle of 45° with respect to the tangential (line) direction of recording tracks in the optical disc 102 of the second kind.

Namely, in this optical pick-up, with respect to the optical disc 102 of the second kind, detection of the tracking error signal is carried out by the so-called push-pull method of the so-called 1 beam system.

Further, this optical pick-up is caused to undergo movement operation along the guide shaft 18 and the support shaft 19, whereby the second object lens 5 is caused to undergo movement operation in such a manner that it is opposite with respect to the entire range of the signal recording area of the optical disc 102 of the second kind. Thus, read operation of information signals can be carried out with respect to the entire range of the signal recording area. Namely, this optical pick-up is caused to undergo movement operation along the inner and outer circumferential directions of the optical disc 102 of the second kind, and the optical disc 102 of the second kind is caused to undergo rotational operation, thereby making it possible to carry out read (read-out) operation of information signals with respect to the entire range of the signal recording area of the optical disc 102 of the second kind.

Further, in the disc player according to this invention, detection of thickness of the transparent base of each of the optical discs 101, 102 loaded on the disc table 40 can be judged by the discrimination means 85 on the basis of amplitude of RF signal which is read out from the disc-shaped optical recording medium 101 oe 102. Namely, when either one of the optical discs 101, 102 of the first kind and the second kind is loaded on the disc table 40, either one of the first and second light sources, which has been determined in advance, is cause to emit light. At this time, if only the focus servo is caused to be operative, amplitude of the RF signal can be detected. In addition, it is possible to judge, on the basis of whether either the first or second light source is caused to emit light and amplitude of the detected RF signal, whether either the optical disc of the first kind or the optical disc of the second kind is loaded on the disc table 40.

What is claimed is:

1. An optical pick-up comprising:

a frame permitted to undergo movement with respect to a disc-shaped optical recording medium adapted so that the central portion thereof is held by a rotational operation mechanism, where said optical medium is caused to undergo rotational operation by the rotational operation mechanism in a direction to come into contact with the central portion of the disc-shaped optical recording medium or to move away therefrom in parallel to the principal surface portion of the disc-shaped optical recording medium;

a first converging means disposed on the frame;

a first light source disposed on the frame and adapted for allowing light beams to be incident to the first converging means;

a first photo-detector disposed on the frame and adapted for detecting light beams emitted from the first light source to be converged onto a signal recording surface of the disc-shaped optical recording medium by the first converging means to allow the converged light beam to be reflected by the signal recording surface;

a second converging means disposed on the frame;

a second light source disposed on the frame for allowing light beams to be incident to the second converging means; and a second photo-detector disposed on the frame for detecting light beams obtained by allowing light beams emitted from the second light source to be converged onto the signal recording surface of the disc-shaped optical recording medium by the second converging means to allow the converged light beam to be reflected by the signal recording surface, wherein the first light source and the second light source emit light beams of wavelengths different from each other.

2. An optical pick-up as set forth in claim 1, wherein a wavelength of light beams that the first light source emits is 635 nm to 650 nm, and a wavelength of light beams that the second light source emits is 780 nm.

3. An optical pick-up as set forth in claim 1, wherein the first converging means comprises a first object lens and a first actuator for supporting the first object lens, wherein the first converging means is permitted to undergo movement in a first tracking direction perpendicular to the optical axis of the first object lens, to allow the first object lens to be positioned opposite the disc-shaped optical recording medium, and wherein the second converging means is composed of a second object lens and a second actuator for supporting the second object lens in the state where the optical axis of the second object lens is caused to be in parallel to the optical axis of the first object lens, thereby permitting the second object lens to undergo movement in a second tracking direction perpendicular to the optical axis of the second object lens to allow the second object lens to be opposite to the disc-shaped optical recording medium.

4. An optical pick-up as set forth in claim 3, wherein at least the second tracking direction of the first and second tracking direction is such that an angle with respect to a normal line of a recording track at a position where the first or second object lens is opposite thereto corresponding to these tracking directions is caused to be closer to 0° than an angle with respect to the normal line in a movement direction of the frame when the object lens is opposite to the innermost circumferential portion of the signal recording area of the disc-shaped optical recording medium to irradiate light beams onto the signal recording surface of the disc-shaped optical recording medium in a manner substantially perpendicular thereto by either one of the first and second object lenses to converge them on the signal recording surface, thus carrying out write or read operations of information signals with respect to the disc-shaped optical recording medium.

5. An optical pick-up as set forth in claim 3, wherein at least the second tracking direction of the first and second tracking directions is such that an angle with respect to normal line of a recording track at a position where the first or second object lens is opposite thereto corresponding to these tracking directions becomes equal to 0° when the object lens is opposite to the position between the innermost circumferential portion and the outermost circumferential portion of the signal recording area of the disc-shaped optical recording medium.

6. An optical pick-up as set forth in claim 3, wherein at least the second tracking direction of the first and second tracking directions is such that an angle with respect to a normal line of a recording track at a position where the first or second object lens is opposite thereto corresponding to said tracking directions when the object lens is opposite to the innermost circumferential portion of the signal recording area of the disc-shaped optical recording medium and an angle with respect to normal line of the recording track when the object lens is opposite to the outermost circumferential portion of the signal recording area of the disc-shaped optical recording medium are substantially equal to each other.

7. An optical pick-up as set forth in claim 3, wherein a numerical aperture of the first object lens is greater than a numerical aperture of the second object lens.

8. An optical pick-up as set forth in claim 3, wherein when the frame moves into contact with the central portion of the disc-shaped optical recording medium or moves away therefrom, it moves either one of the first and second object lens opposite to a line passing through the center of the disc-shaped optical recording medium and in parallel to movement direction between the frame and the disc-shaped optical recording medium.

9. An optical pick-up as set forth in claim 8, wherein one of the first and second tracking directions is in correspondence with a radial direction of the disc-shaped optical recording medium, and the other of the first and second tracking directions is inclined with respect to the radial direction of the disc-shaped optical recording medium.

10. An optical pick-up as set forth in claim 8, wherein at least the second tracking direction of the first and second tracking directions is such that an angle with respect to a normal line of a recording track at a position where the first or second object lens is opposite thereto corresponding to these tracking directions when the object lens is opposite to the innermost circumferential portion of the signal recording area of the disc-shaped optical recording medium, and an angle with respect to a normal line of the recording track when the object lens is opposite to the outermost circumferential portion of the signal recording area of the disc-shaped optical recording medium are substantially equal to each other.

11. An optical pick-up as set forth in claim 3, wherein the first and second converging means are arranged in a circumferential direction of the disc-shaped recording medium, and the first and second object lenses are disposed in a manner close to each other where a line passing through the center of the disc-shaped optical recording medium and in parallel to a movement direction between the frame and the disc-shaped optical recording medium is located therebetween.

12. An optical pick-up as set forth in claim 3, wherein the first and second object lenses are arranged in a radial direction of the disc-shaped optical recording medium, where said radial direction is a movement direction between the frame and the disc-shaped optical recording medium.

13. An optical pick-up as set forth in claim 12, wherein a numerical aperture of the first object lens is greater than a numerical aperture of the second lens, and the first object lens is disposed at the inner circumferential side of the disc-shaped optical recording medium relative to the second object lens.

14. An optical pick-up as set forth in claim 3, wherein the first actuator comprises a supporting member for movably supporting the first object lens, and a magnetic circuit adapted to apply, to the first object lens, drive force for moving the first object lens in an optical axis direction and in a direction perpendicular to the optical axis, and wherein the second actuator comprises a supporting member for movably supporting the second object lens, and a magnetic circuit adapted to apply, to the second object lens, drive force for moving the second object lens in the optical axis direction and in the direction perpendicular to the optical axis.

15. An optical pick-up comprising:

a frame permitted to undergo movement with respect to a disc-shaped optical recording medium adapted so that the central portion thereof is held by a rotational operation mechanism and caused to undergo rotational operation by the rotational operation mechanism in a direction to come into contact with the central portion of the disc-shaped optical recording medium or to move away therefrom in parallel to the principal surface portion of the disc-shaped optical recording medium;

a first converging means comprising a first object lens, and a first actuator for supporting the first object lens so that it is permitted to undergo movement operation in a first tracking direction which is a direction perpendicular to the optical axis of the first object lens to allow the first object lens to be opposite to the disc-shaped optical recording medium, wherein the first converging means is disposed on the frame;

a first light source disposed on the frame and adapted for allowing light beams to be incident to the first converging means;

a first photo-detector disposed on the frame and adapted for detecting light beams obtained by allowing light beams emitted from the first light source to be converged onto a signal recording surface of the disc-shaped optical recording medium by the first converging means to allow the converged light to be reflected by the signal recording surface;

a second converging means composed of a second object lens having a numerical aperture smaller than that of the first object lens, and a second actuator for supporting the second object lens so that it is permitted to undergo movement operation in a second tracking direction which is a direction perpendicular to the optical axis of the second object lens to allow the second object lens to be opposite to the disc-shaped optical recording medium, the second converging means being disposed on the frame;

a second light source disposed on the frame and adapted for allowing light beams of a wavelength longer than those emitted by the first light source, so as to be incident to the second converging means; and a second photo-detector disposed on the frame and adapted for detecting light beams obtained by allowing light beams emitted from the second light source to be converged onto the signal recording surface of the disc-shaped optical recording medium by the second converging means to allow the converged light to be reflected by the signal recording surface, wherein the first and second converging means are disposed on planes flush with each other.

16. An optical pick-up as set forth in claim 15, wherein a wavelength of light beams that the first light source emits is 635 nm to 650 nm, and a wavelength of light beams that the second light source emits is 780 nm.

17. An optical pick-up as set forth in claim 15, wherein a numerical aperture of the first object lens is 0.6, and a numerical aperture of the second object lens is 0.45.

18. An optical pick-up as set forth in claim 15, wherein when the frame is caused to undergo movement to come into contact with the central portion of the disc-shaped optical recording medium or to move away therefrom, said frame moves either one of the first and second object lenses opposite to a line passing through a center of the disc-shaped optical recording medium, and in parallel to a movement direction between the frame and the disc-shaped optical recording medium.

19. An optical pick-up as set forth in claim 16, wherein the first and second converging means are arranged in a circumferential direction of the disc-shaped optical recording medium, and the first and second object lenses are disposed in a manner close to each other where a line passing through the center of the disc-shaped optical recording medium and in parallel to relative movement between the frame and the disc-shaped optical recording medium is located therebetween.

20. An optical pick-up as set forth in claim 15, wherein the first actuator comprises a supporting member for movably supporting the first object lens, and a magnetic circuit adapted to apply, to the first object lens, a drive force for moving the first object lens in an optical axis direction and in a direction perpendicular to the optical axis, and wherein the second actuator comprises a second object lens, and a magnetic circuit adapted to apply, to the second object lens, a drive force for moving the second object lens in the optical axis direction and in the direction perpendicular to the optical axis.

21. A disc player comprising:

a rotational operation mechanism adapted for holding the central portion of a disc-shaped optical recording medium to allow the disc-shaped optical recording medium to undergo rotational operation, a frame supported so that it is permitted to undergo movement with respect to the disc-shaped optical recording medium caused to undergo rotational operation by the rotational operation mechanism in a direction to contact the central portion of the disc-shaped optical recording medium, or to move away therefrom in parallel to the principal surface portion of the disc-shaped optical recording medium;

a movement operation mechanism for allowing the disc-shaped optical recording medium or the frame to undergo movement in a radial direction of the disc-shaped optical recording medium;

a first converging means disposed on the frame;

a first light source disposed on the frame and adapted for allowing light beams to be incident to the first converging means;

a first photo-detector disposed on the frame and adapted for detecting light beams obtained by allowing light beams emitted from the first light source to be converged onto a signal recording surface of the disc-shaped optical recording medium by the first converging means to allow the converged light to be reflected by the signal recording surface;

a second converging means disposed on the frame;

a second light source disposed on the frame and adapted for allowing light beams to be incident to the second converging means;

a second photo-detector disposed on the frame and adapted for detecting light beams obtained by allowing light beams emitted from the second light source to be converged onto the signal recording surface of the disc-shaped optical recording medium by the second converging means to allow the converged light to be reflected by the signal recording surface; and switching means for carrying out switching between the first and second light sources in correspondence with kind of the disc-shaped optical recording medium caused to undergo rotational operation by the rotational operational mechanism, thus carrying out recording or reproduction of information signals with respect to the disc-shaped optical recording medium, wherein the first light source and the second light source emit light beams of wavelengths different from each other.

22. A disc player as set forth in claim 21, wherein when the frame is caused to relatively undergo movement operation in a direction to come into contact with the central portion of the disc-shaped optical recording medium or to move away therefrom, it moves either one of the first and second object lenses opposite to a line passing through the center of the disc-shaped optical recording medium and in parallel to a movement direction between the frame and the disc-shaped optical recording medium.

23. A disc player as set forth in claim 21, wherein a wavelength of light beams that the first light source emits is 635 nm to 650 nm, and a wavelength of light beams that the second light source emits is 780 nm.

24. A disc player as set forth in claim 21, wherein the first converging means is composed of a first object lens, and a first actuator for supporting the first object lens so that it is permitted to undergo movement operation in a first tracing direction in a direction perpendicular to the optical axis of the first object lens to allow the first object lens to be opposite to the disc-shaped optical recording medium, and wherein the second converging means comprises a second object lens, and a second actuator for supporting the second object lens where the optical axis of the second lens is caused to be in parallel to the optical axis of the first object lens to permit the second object lens to undergo movement operation in a second tracking direction which is a direction perpendicular to the optical axis of the second object lens, to allow the second object lens to be opposite to the disc-shaped optical recording medium.

25. A disc player as set forth in claim 24, wherein a numerical aperture of the first object lens is greater than a numerical aperture of the second object lens.

26. A disc player as set forth in claim 21, comprising a tilting mechanism for tilting an emitting direction of light beams from the object lens in correspondence with an inclination of the signal recording surface of the disc-shaped optical recording medium.

* * * * *

UNITED STATES PATENT AND TRADEMARK OFFICE
CERTIFICATE OF CORRECTION

PATENT NO.   : 6,097,690
DATED        : August 1, 2000
INVENTOR(S)  : Mochizuki et al.

It is certified that error appears in the above-identified patent and that said Letters Patent is hereby corrected as shown below:

<u>Column 36, claim 24,</u>
Line 1, et seq., should read;

24. A disc player as set forth in claim 21,
   wherein the first converging means is composed of a first object lens, and a first actuator for supporting the first object lens so that it is permitted to undergo movement operation in first tracking direction in a direction perpendicular to the optical axis of the first object lens to allow the first object lens to be opposite to the disc-shaped optical recording medium, and
   wherein the second converging means comprises a second object lens, and a second actuator for supporting the second object lens where the optical axis of the second lens is caused to be in parallel to the optical axis of the first object lens to permit the second object lens to undergo movement operation in a second tracking direction which is a direction perpendicular to the optical axis of the second object lens, to allow the second object lens to be opposite to the disc-shaped optical recording medium.

Signed and Sealed this

Eighteenth Day of December, 2001

Attest:

JAMES E. ROGAN
*Attesting Officer*     *Director of the United States Patent and Trademark Office*